(12) United States Patent
Yoo et al.

(10) Patent No.: US 11,297,975 B2
(45) Date of Patent: Apr. 12, 2022

(54) HYDROGEN WATER GENERATOR

(71) Applicant: LG ELECTRONICS INC., Seoul (KR)

(72) Inventors: Hyun Sun Yoo, Seoul (KR); Joo Gyeom Kim, Seoul (KR); Jae Hung Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 113 days.

(21) Appl. No.: 16/596,433

(22) Filed: Oct. 8, 2019

(65) Prior Publication Data

US 2020/0359832 A1   Nov. 19, 2020

(30) Foreign Application Priority Data

May 14, 2019  (KR) ................. 10-2019-0056325
Jul. 10, 2019  (KR) ................. 10-2019-0083420

(51) Int. Cl.
*C02F 1/68* (2006.01)
*A47J 31/44* (2006.01)
(Continued)

(52) U.S. Cl.
CPC ......... *A47J 31/4482* (2013.01); *C02F 1/4618* (2013.01); *C02F 1/4676* (2013.01); *C02F 1/46109* (2013.01); *C02F 1/68* (2013.01); *A47J 31/4425* (2013.01); *B67D 1/001* (2013.01); *B67D 1/101* (2013.01); *C02F 1/008* (2013.01);
(Continued)

(58) Field of Classification Search
CPC ............... A47J 31/4482; A47J 31/4425; C02F 1/46109; C02F 1/4676; C02F 1/4618; C02F 1/68; C02F 1/008; C02F 2001/4619; C02F 2307/10; C02F 2103/026; B67D 1/001; B67D 1/101; Y02E 60/36

See application file for complete search history.

(56) References Cited

U.S. PATENT DOCUMENTS 4,635,691 A * 1/1987 Hume .................. B67D 3/0025
141/198
5,295,517 A * 3/1994 Ahlers ...................... B67C 3/20
141/1
(Continued)

FOREIGN PATENT DOCUMENTS

CN       202287831        *  7/2012  .............. A47J 31/46
CN       202287831  U       7/2012
(Continued)

OTHER PUBLICATIONS

Machine translation of CN 202287831U, Jul. 4, 2012, all pages (Year: 2012).*

*Primary Examiner* — Nicolas A Arnett
(74) *Attorney, Agent, or Firm* — Dentons US LLP

(57) ABSTRACT

A hydrogen water generator includes a water tank for receiving and storing water, an electrode module coupled to the water tank for generating hydrogen water, a movable water discharger, a transfer tube for transferring the hydrogen water from the water tank to the movable water discharger, a sensor, and a controller. The controller moves the movable water discharger from an original position to a height with respect to a water container based on a sensing by the sensor.

19 Claims, 19 Drawing Sheets

(51) Int. Cl.
*C02F 1/467* (2006.01)
*C02F 1/461* (2006.01)
*B67D 1/00* (2006.01)
*B67D 1/10* (2006.01)
*C02F 1/00* (2006.01)
*C25B 1/04* (2021.01)
*C02F 103/02* (2006.01)

(52) U.S. Cl.
CPC .... *C02F 2103/026* (2013.01); *C02F 2307/10* (2013.01); *C25B 1/04* (2013.01)

(56) References Cited

U.S. PATENT DOCUMENTS

| | | | | |
|---|---|---|---|---|
| 6,443,335 | B1* | 9/2002 | Pinedjian | B67D 1/0006 222/504 |
| 8,596,086 | B2* | 12/2013 | Kim | F25D 23/126 62/389 |
| 9,963,794 | B2* | 5/2018 | Iwai | C25B 1/04 |
| 10,343,888 | B2* | 7/2019 | Jeon | A47J 31/4482 |
| 10,941,031 | B2* | 3/2021 | Jung | B67D 1/0085 |
| 2005/0169373 | A1 | 8/2005 | Hong | |
| 2013/0146179 | A1* | 6/2013 | McMahan | B67D 1/1238 141/83 |
| 2020/0359831 | A1* | 11/2020 | Yoo | A47J 31/4407 |
| 2020/0361759 | A1* | 11/2020 | Yoo | C02F 1/4618 |
| 2020/0361785 | A1* | 11/2020 | Yoo | C25B 15/02 |
| 2020/0361796 | A1* | 11/2020 | Yoo | C02F 1/4618 |
| 2020/0361799 | A1* | 11/2020 | Yoo | C25B 1/04 |

FOREIGN PATENT DOCUMENTS

| | | |
|---|---|---|
| CN | 104433802 A | 3/2015 |
| CN | 207699270 U | 8/2018 |
| DE | 102015109249 A1 | 12/2016 |
| DE | 102015113258 A1 | 2/2017 |
| EP | 1827185 B1 | 9/2007 |
| EP | 2454977 A1 | 5/2012 |
| KR | 101810149 B | 12/2017 |
| KR | 101889498 B | 8/2018 |

* cited by examiner

HYDROGEN WATER GENERATOR

CROSS-REFERENCE TO RELATED APPLICATIONS

This application claims the benefit of priority to Korean Patent Application Nos. 10-2019-0056325 filed on May 14, 2019 and 10-2019-0083420 filed on Jul. 10, 2019 with the Korean Intellectual Property Office, the entire contents of which are incorporated herein by reference.

FIELD OF THE DISCLOSURE

The present disclosure relates to a hydrogen water generator, and to a hydrogen water generator that generates hydrogen water and discharges hydrogen water.

BACKGROUND

Generally, hydrogen water refers to water in which hydrogen ($H_2$) are mixed at a predetermined level or more. The hydrogen water is effective in preventing dermatitis such as atopic dermatitis, skin whitening, aging through antioxidant, and may increase immunity when drunk.

In particular, when oxygen radicals enter the human body, the free radicals may cause various diseases such as cancer. In this regard, drinking hydrogen water may have the effect of removing such active oxygen radicals, which has attracted much attention.

The solubility of hydrogen in water is about 0.0002, which is one of the relatively poor soluble gases. In addition, even when hydrogen water is prepared by dissolving hydrogen in water, hydrogen may easily escape from water. Therefore, it is necessary to minimize the escape of hydrogen in the hydrogen water to the outside environment at all stages starting from the generation of hydrogen water to the user drinking the hydrogen water. Providing a high concentration level of hydrogen water through these stages may be important in improving the drinking effects of hydrogen water.

Hydrogen water is a product that may be used regardless of gender or age. In addition, each user has a wide variety of tastes and preferences for the water container used to drink water. For example, some users prefer a water container that is low in height and wide in cross section, such as a bowl. Other users prefer a water container with narrow cross-sectional area but high in height, such as a tumbler. In addition, even if the same water container is used, the manner in which water is contained in the water container may be different for according to the user. For example, some users prefer to drink large amounts of water at one time. Other users prefer to drink several times, each time with a small amount of water.

Furthermore, even if the user's taste or preference of a water container is not considered, a user drinks water very frequently in everyday life. Accordingly, the user may use the water container irrespective of its type or form as long as it is stored at the hydrogen water generator and may be easily used. Therefore, there is a need to ensure that there is no restriction according to the water container used when using hydrogen water generator. In this way, providing a user with a wide range of choices may be an important task for improving convenience of use.

An example of a hydrogen water generator may be found in Korean Patent No. 10-1810149. The hydrogen water generator generates, stores, and discharges hydrogen water. The hydrogen water generator produces hydrogen by electrolyzing water using an electrolytic cell and supplies the hydrogen to a water container where the hydrogen dissolves in water. The hydrogen water in the water container is dispensed through a discharge cork.

The hydrogen water generator requires that the hydrogen be sealed in the water container which is a dedicated container and an essential component for implementing the main functions of the hydrogen water generator. However, in the process of discharging hydrogen water through the discharge cork to the user's preferred water container, the process of preventing hydrogen loss is not considered at all. Therefore, the hydrogen water generator may inevitably lose a large amount of hydrogen in the process of discharging the hydrogen water and afterwards until the user drinks the hydrogen water.

Another example of a hydrogen water generator may be found in Korean Patent Registration No. 10-1889498. The hydrogen water generator is a lifting type hydrogen water generator that uses a disposable water container. Specifically, water is filled in the disposable water container and a sealing membrane seals the top of the disposal water container. A punching pin is coupled to an elevating member which moves up and down. When the lifting member is lowered, the punching pin penetrates the sealing membrane 4 and immerses in the water inside the disposable container, and in this state, electrolysis of water to produce hydrogen water is performed.

The hydrogen water generator uses a disposable container which is used in combination with a separate sealing membrane, and thus is a dedicated water container which is difficult to replace using a regular water container. Also, there is a restriction in that hydrogen water is generated only when sufficient water is contained in the disposable water container so that the punching pin penetrates the sealing membrane to enter the inside of the disposable water container and make contact with the water. In addition, the lifting member moves the punching pin for electrolysis of water. This configuration is only related to the generation of hydrogen water, and no consideration is given to the hydrogen water discharge process and other processes.

The hydrogen water generator should minimize the loss of hydrogen in the hydrogen water and should provide no restriction in the water container to be used, which may not be found in the hydrogen water generators described above.

SUMMARY

One aspect is to minimize the release of hydrogen to the outside environment in the process of discharging the hydrogen water from the hydrogen water generator. The aim is to provide users with high concentration of hydrogen in the hydrogen water even if they use a regular water container instead of a dedicated special water container.

Another aspect is to minimize the release of hydrogen to the outside environment even after the hydrogen water has been discharged from the hydrogen water generator. Through this, even if the user does not drink immediately after withdrawing hydrogen water, the user may still drink hydrogen water with a high concentration of hydrogen.

Another aspect is to ensure that the optimum state of hydrogen water discharge is maintained to minimize impact of the discharged hydrogen water. Through this, hydrogen water with a high concentration of hydrogen may be conveniently and stably obtained.

The disclosure describes a hydrogen water generator that includes a water tank for receiving and storing water, an electrode module coupled to the water tank for generating hydrogen water, a movable water discharger, a transfer tube for transferring the hydrogen water from the water tank to the movable water discharger, a sensor, and a controller. The controller moves the movable water discharger from an original position to a height with respect to a water container based on a sensing by the sensor.

The disclosure describes a hydrogen water generator that includes a body including a first protrusion at an upper portion of the body, the first protrusion including a movable water discharger, and a second protrusion at a lower portion of the body facing the first protrusion, the second protrusion including a seating part in which a water container is seated, a water tank for receiving and storing water, an electrode module coupled to the water tank for generating hydrogen water, a transfer tube for transferring the hydrogen water from the water tank to the movable water discharger, a sensor, and a controller. The controller moves the movable water discharger from an original position to a height with respect to the water container based on a sensing by the sensor.

DETAILED DESCRIPTION OF THE PREFERRED EMBODIMENTS

Figure 1:
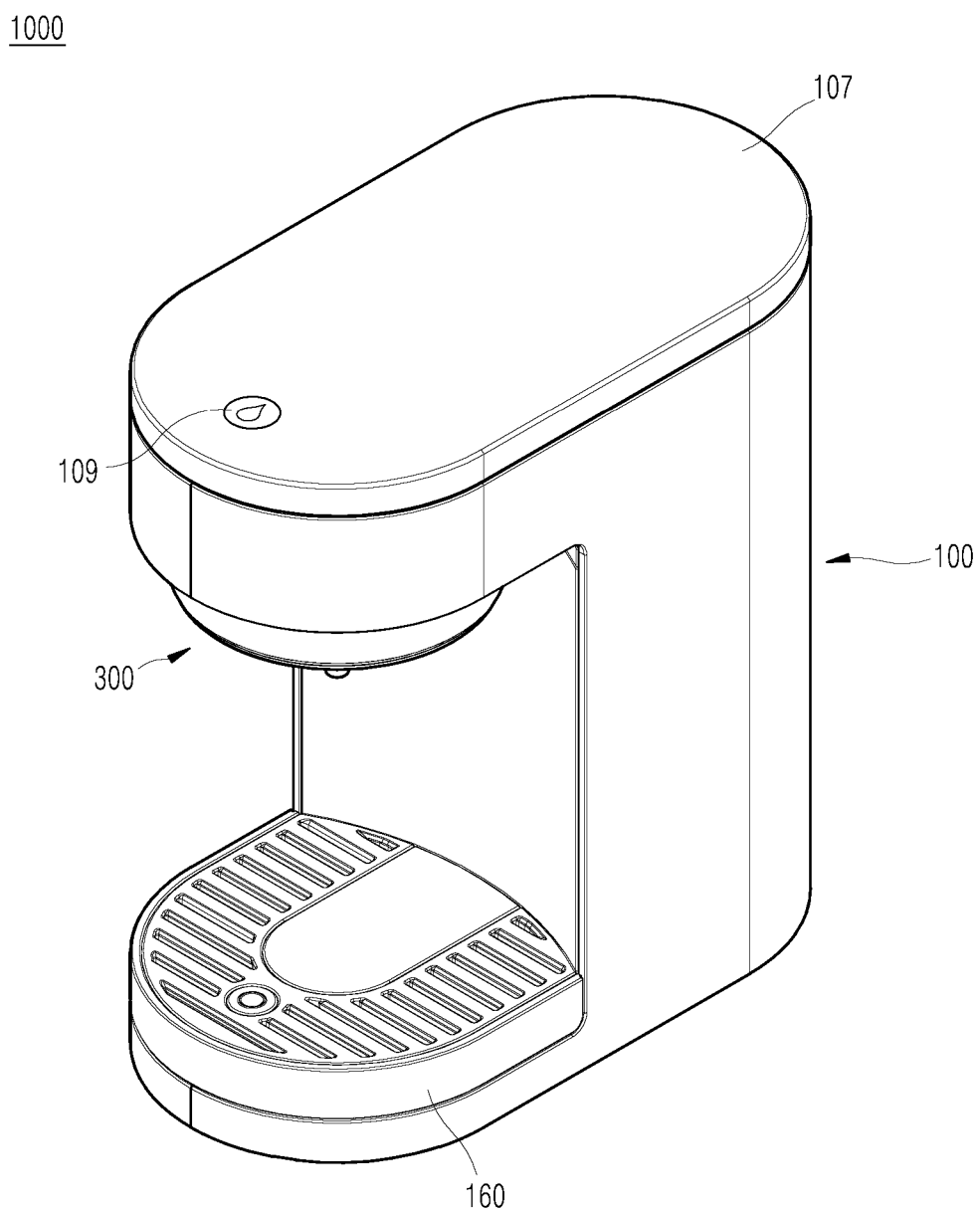
FIG. 1 is a perspective view showing a hydrogen water generator according to a first embodiment of the present invention.
Figure 2:
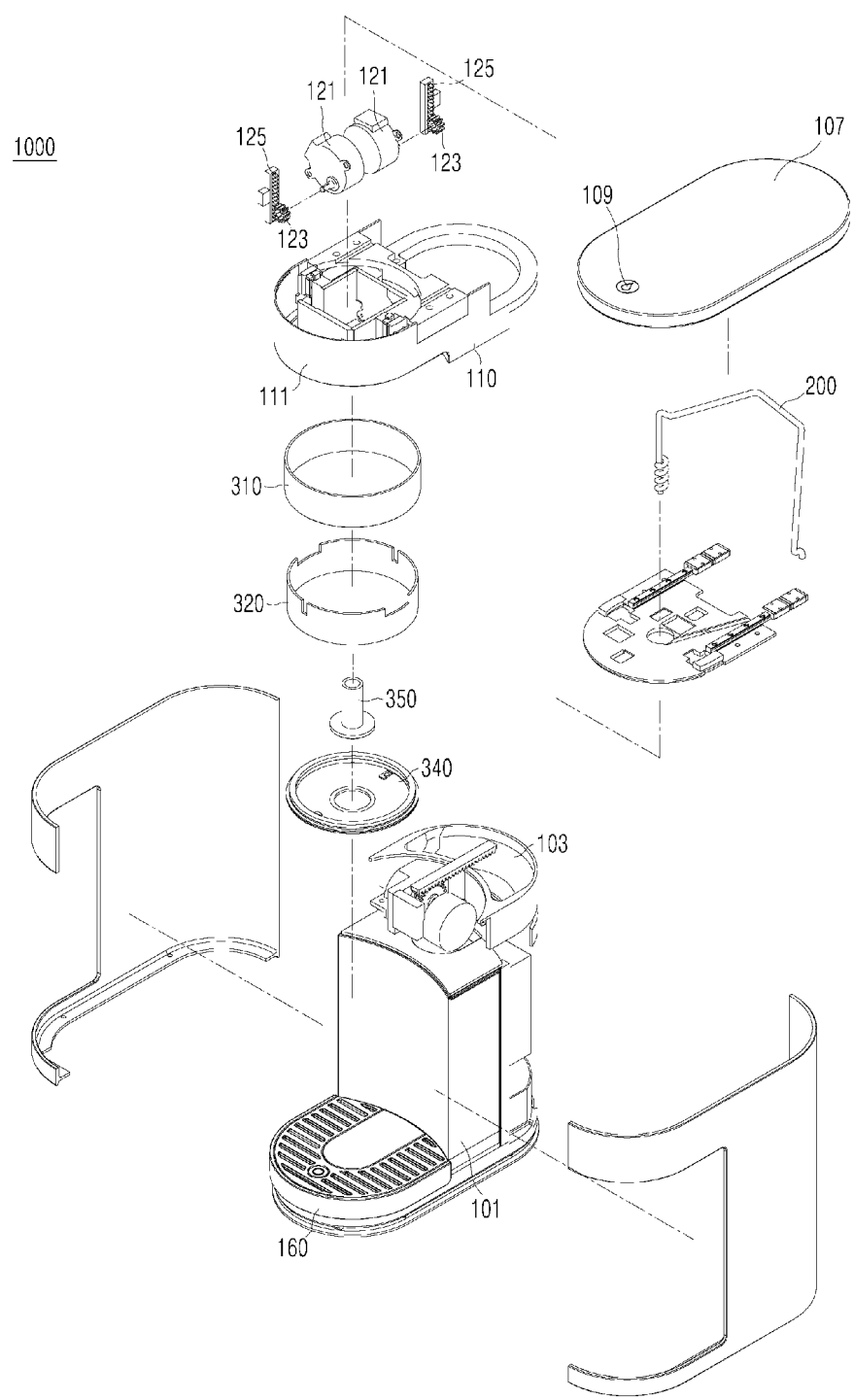
FIG. 2 is an exploded perspective view showing a main configuration of the hydrogen water generator according to the first embodiment of the present invention.
Figure 3:
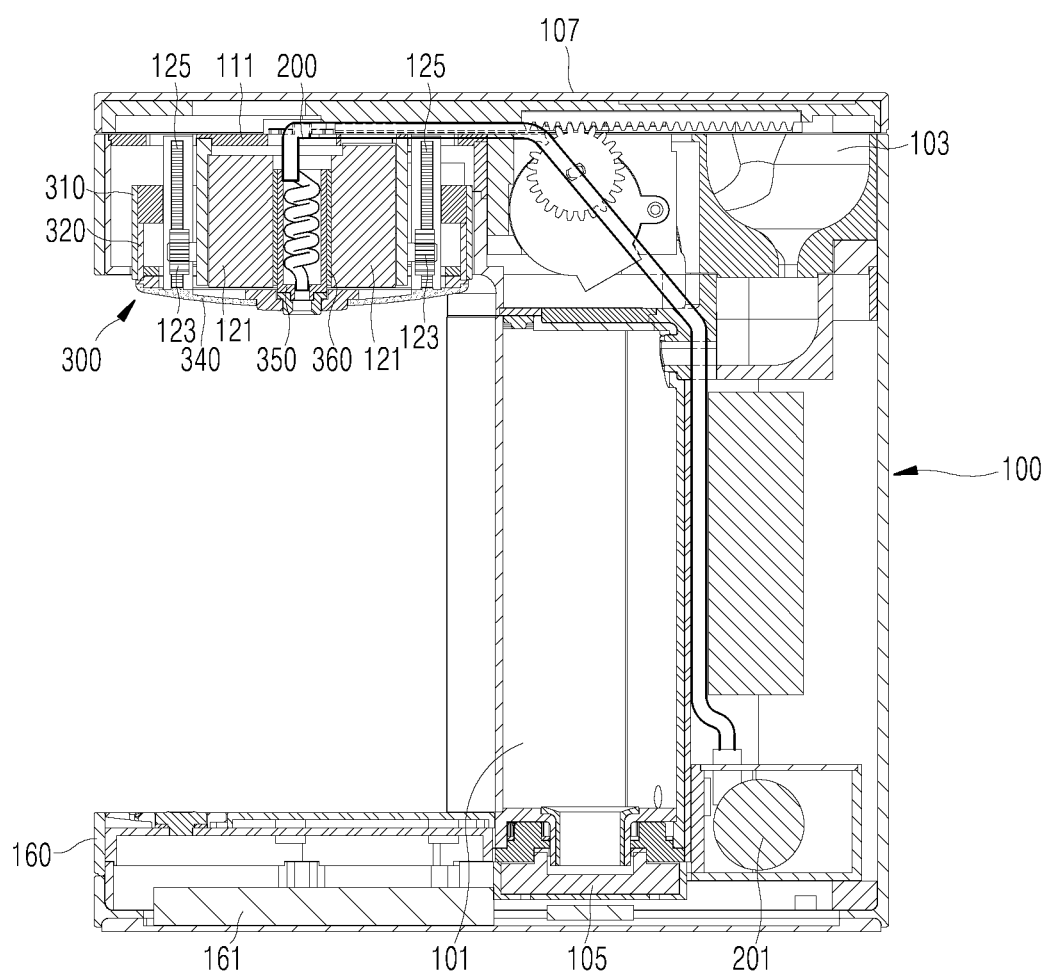
FIG. 3 is a cross-sectional view showing the main configuration of the hydrogen water group according to the first embodiment of the present invention.

FIG. 1 is a perspective view showing a hydrogen water generator according to a first embodiment of the present invention. FIG. 2 is an exploded perspective view showing a main configuration of the hydrogen water generator according to the first embodiment of the present invention. FIG. 3 is a cross-sectional view showing the main configuration of the hydrogen water generator according to the first embodiment of the present invention.

Referring to FIGS. 1 to 3, the hydrogen water generator 1000 according to the first embodiment of the present invention includes a main body 100, a transfer pipe 200, and a movable water discharger 300.

The main body 100 is a part for preparing and storing hydrogen water, and is a part forming a main appearance in the hydrogen water generator 1000 according to the present embodiment. The transfer pipe 200 and the movable water discharger 300 to be described later are both installed in the main body 100 and facilitates the function of the main body 100. Thus, the main function of the hydrogen water generator 1000 is performed in the main body 100.

The main body 100 may include a water tank 101 for storing water and a water supply inlet 103 that is coupled to the water tank 101. When the user pours water into the water supply inlet 103, water is supplied into the water tank 101 coupled to the water supply inlet 103. The main body 100 may include an electrode module 105 coupled to the water tank 101 to generate hydrogen and supply the hydrogen to the water stored in the water tank 101 to produce hydrogen water. Specifically, the electrode module 105 may electrolyze the water in the water tank 101 to generate oxygen in the positive electrode plate and hydrogen in the negative electrode plate. The electrode module 105 may be called a hydrogen water generating module or a generating module. However, these terms are merely differences in expression and their functions and effects may be substantially the same. The hydrogen generated by the electrode module 105 dissolves in the water stored in the water tank resulting in the hydrogen water being generated and stored in the water tank 101.

The main body 100 may include a upper plate 107 covering the water tank 101 and the water supply inlet 103 from the outside environment. The upper plate 107 may hermetically seal the water tank 101 and the water supply inlet 103 from the outside environment. Thus, when the user pours water into the water supply inlet 103 and then closes the water supply inlet 103 with the upper plate 107, the water tank 101 and the water supply inlet 103 may be sealed from the outside environment. Hydrogen, which may escape from the hydrogen water stored in the water tank 101, may be prevented from being discharged from the main body 100 to the outside environment.

As described above, when the user pours the water into the main body 100, hydrogen water may be generated and stored in the main body 100. It should be noted that the main body 100 is not limited to include only the exemplary configuration described above, and may include various configurations for generating and storing hydrogen water.

The transfer pipe 200 may be installed in the main body 100 so that the hydrogen water stored in the main body 100 may be transferred through the main body 100. For instance, the hydrogen water generated and stored in the main body 100 may be transferred to the movable water discharger 300 through the transfer pipe 200. For example, one end of the transfer pipe 200 may be coupled to the water tank 101 and the other end thereof may be coupled to the movable water discharger 300. In this case, as described above, the hydrogen water generated through the electrode module 105 and stored in the water tank 101 may be transferred to the movable water discharger 300 through the transfer pipe 200. A water pump 201 may be combined with the transfer pipe 200 to pump out the hydrogen water in the water tank 101 and transfer the hydrogen water through the transfer pipe 200 to the movable water discharger 300. In one embodiment, the transfer pipe 200 may be in a form of branches and is coupled to a separate valve or the like to selectively adjust the transfer direction of the hydrogen water.

The movable water discharger 300 may be coupled to the transfer pipe 200 to supply the hydrogen water outside of the main body 100, for example, to a water container. The movable water discharger 300 may be coupled to the end of the transfer pipe 200, which constitutes a transfer path of the hydrogen water, such that a portion of the transfer path is exposed outside of the main body 100. In the present embodiment, the movable water discharger 300 may be installed in the main body 100 and is movable such that a portion thereof may move in and out of the main body 100 to be exposed to the outside environment. Thus, according to an operation of the movable water discharger 300, the hydrogen water generated and stored in the main body 100 is transferred through the transfer pipe 200 to the movable water discharger 300 to be discharged through the portion of the movable water discharger exposed outside of the main body 100.

The movable water discharger 300 may be installed in the main body 100 and may move up and down from the main body 100. According to a height in which the movable water discharger 300 moves down from the main body 100, the height in which the hydrogen water is discharged may vary. A water container may be placed below the movable water discharger 300 to receive the hydrogen water. The movable water discharger 300 may move from the main body 100 towards the water container and may be set at a discharge height from which the hydrogen water may be discharged. Because the height of the movable water discharger 300 may be adjusted, the user may have various options regarding the type of the water container to be used to drink hydrogen water and the user may use a water container according to their taste or usage.

On the other hand, it may be possible to maintain an amount of dissolved hydrogen in the hydrogen water needed to exert a drinking effect of the hydrogen water. Being a nonpolar molecule, hydrogen does not readily dissolve in water and when a certain amount of impact is applied, hydrogen is easily released from the hydrogen water. Therefore, the amount of dissolved hydrogen in the hydrogen water may be maintained at or above the set value by minimizing the impact caused by the hydrogen water discharged into the water container. For this purpose, it is desirable to limit the height in which the hydrogen water is discharged from the movable water discharger.

In order to exert the drinking effect of hydrogen water, the discharge height of hydrogen water may be limited by a predetermined range or value, which may be referred to as a stable discharge height H. In this case, the discharge height may be the height from the water level surface of the hydrogen water filled in the water container to the discharge point of the moving water charger 300. The discharged water height should be lower than the stable discharged water height H, which may be a height that may prevent the hydrogen from escaping the hydrogen water as much as possible.

The stable discharge height H could take into consideration one or more factors depending on the characteristics of the user who uses the hydrogen water generator 1000. Alternatively, one or more factors could be considered depending on the external environment in which the hydrogen water generator 1000 is used. Or it could be appropriately selected in consideration of one or more factors surrounding the use of the hydrogen water discharged from the hydrogen water generator 1000.

Accordingly, the hydrogen water generator 1000 according to the present embodiment may minimize the impact of the falling hydrogen water when the hydrogen water is discharged resulting in hydrogen escaping from the hydrogen water. Specifically, when the hydrogen water generated in the hydrogen water generator 1000 is discharged to the water container, the movable water discharger may be lowered towards the water container. Through this, when the hydrogen water produced in the hydrogen water generator 1000 is discharged to the water container, the hydrogen water may be discharged within the stable discharge height H. Accordingly, it may be possible to drink hydrogen water with a high concentration of hydrogen by minimizing the escape of hydrogen during hydrogen water discharge.

The hydrogen water generator 1000 according to the present embodiment may discharge hydrogen water within the stable discharge height H even when various water container size is used. Specifically, the movable water discharger 300 may move with respect to the main body 100 according to the height and/or size of the water container. Through this, the height of the discharged hydrogen water may change to correspond to the height and/or size of the water container placed at the hydrogen water generator 1000. Accordingly, even when the water container placed at the hydrogen water generator varies, it may be possible to drink hydrogen water having a high concentration of hydrogen.

The hydrogen water generator 1000 according to the present embodiment may lower the movable water discharger 300 to a height such that a lower surface of the movable water discharger 300 may make close contact with an upper surface of the water container 10 when the water container is placed below the movable water discharger 300. For example, the upper surface of the water container and the lower surface of the movable water discharger may make contact such that the water container may be hermetically sealed from the outside air by the lower surface of movable water discharger 300 pressing against the upper surface of the water container. Accordingly, the hydrogen water generator 1000 according to the present embodiment minimizes the escape of hydrogen not only at the time of discharge but also during the time in which the discharged hydrogen water is stored in the water container until the user drinks the hydrogen water. That is, when the hydrogen water generated in the hydrogen water generator 1000 is discharged to the water container, the movable water discharger 300 is lowered towards the water container to make contact with the water container.

Hydrogen water generated in the hydrogen water generator 1000 may be discharged into the water container in a state in which the movable water discharger 300 is in close contact with the upper surface of the water container 10. In this case, even when the discharged hydrogen water is not drunk immediately, it may be still possible to drink hydrogen water with high concentration hydrogen.

Figure 4:
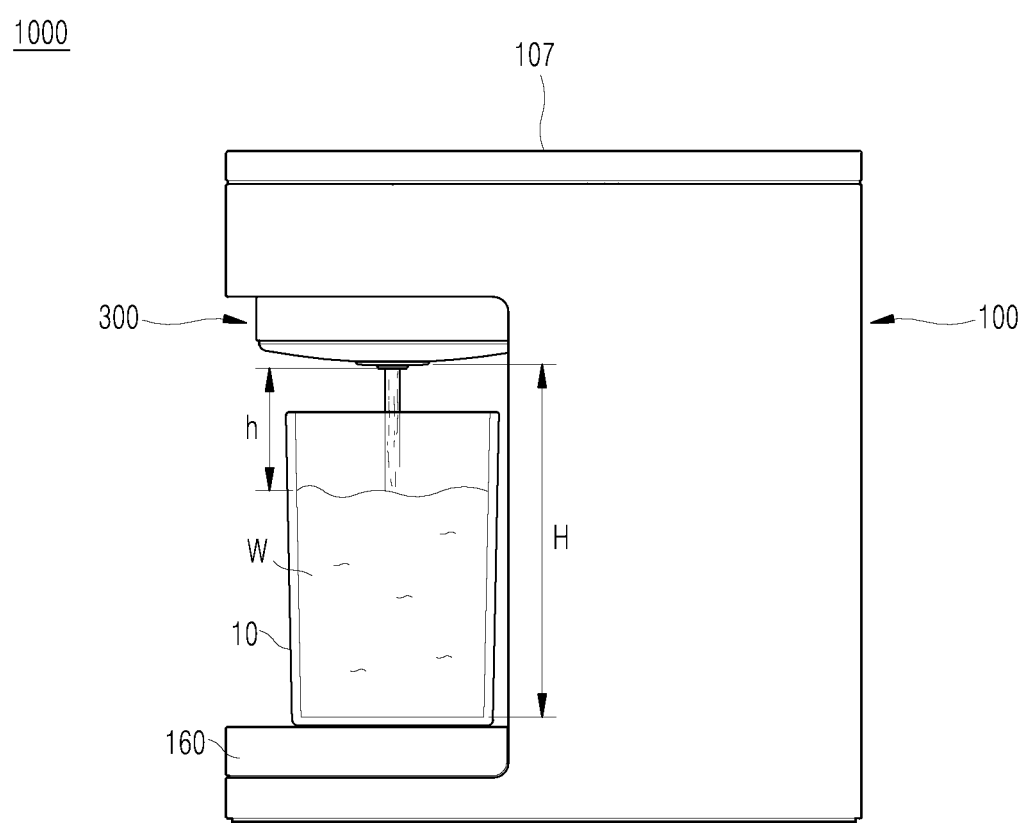
FIG. 4 is a view showing an example of a state using the hydrogen water generator according to the first embodiment of the present invention.

FIG. 4 is a view showing an example of a state using the hydrogen water generator according to the first embodiment of the present invention.

Referring to FIG. 4, first, the user may open the upper plate 107 of the main body 100 and then pour water into the water supply inlet 103. In this case, the opening of the upper plate 107 may be performed by pressing or touching an operation button 109 installed on the outside of the main body 100 (see FIG. 1). The water poured into the water supply inlet 103 is supplied to the water tank 101 coupled to the water supply inlet 103. When the pouring of water is completed, the user closes the upper plate 107 and inputs a signal for generating hydrogen water W. In this case, closing of the upper plate 107 may also be performed by pressing or touching the operation button 109. Furthermore, input of a signal for generating or discharging hydrogen water W may also be performed by pressing or touching the same operation button 109. While the present embodiment shows one operation button 109 performing multiple functions, several operation buttons may be provided where one operation button performs one function.

A controller (see FIG. 6) receives the input signal and controls the electrode module 105. Hydrogen is generated by electrolyzing water in the electrode module 105 according to the control of the controller for generating hydrogen water W. Then, the generated hydrogen is dissolved in the stored water in the water tank 101, and the generated hydrogen water W is stored in the water tank 101. This process may be made within a set time from the input of the signal for producing hydrogen water W. Then, the hydrogen water generator 1000 may be placed in a standby mode while maintaining the generated hydrogen water W.

Thereafter, the user may place a water container 10 below the movable water discharger 300 to obtain the generated hydrogen water W. A first signal for hydrogen water W discharge may be inputted. Here, the first signal is a signal that is inputted when the user intends to drink immediately after discharge of the hydrogen water W. That is, the first signal causes the controller to move the movable water discharger 300 lower towards the water container 10 to the stable discharge height H without being in close contact with the upper surface of the water container 10. According to the first signal for discharging the hydrogen water W, the controller prepares the movable water discharger 300 for discharging the hydrogen water W. Then, the hydrogen water discharger 300 descends to the stable discharge height H corresponding to the water container 10 that is being used. The movable water discharger 300 may be coupled with a sensor to sense a dimension of the water container 10 which is sent to the controller for determination of the stable height H.

When the movable water discharger 300 is lowered to the stable outlet height H, the movable water discharger 300 discharges the hydrogen water W to fill the water container 10. In this case, the amount of hydrogen water W to be filled in the water container 10 through one discharge of water may be set in the hydrogen water generator 1000 by the user. Or, it may be set in advance by the manufacturer of the hydrogen water generator 1000. Alternatively, the hydrogen water W may be discharged while the user presses the operation button 109. The water discharge method of the hydrogen water W may be variously modified as needed.

When the discharge of the hydrogen water W is completed through the above process, the controller may cause the movable water discharger 300 to move back up to its original position in the main body 100. The user may then retrieve the water container 10 and drink the hydrogen water W filled therein.

Figure 5:
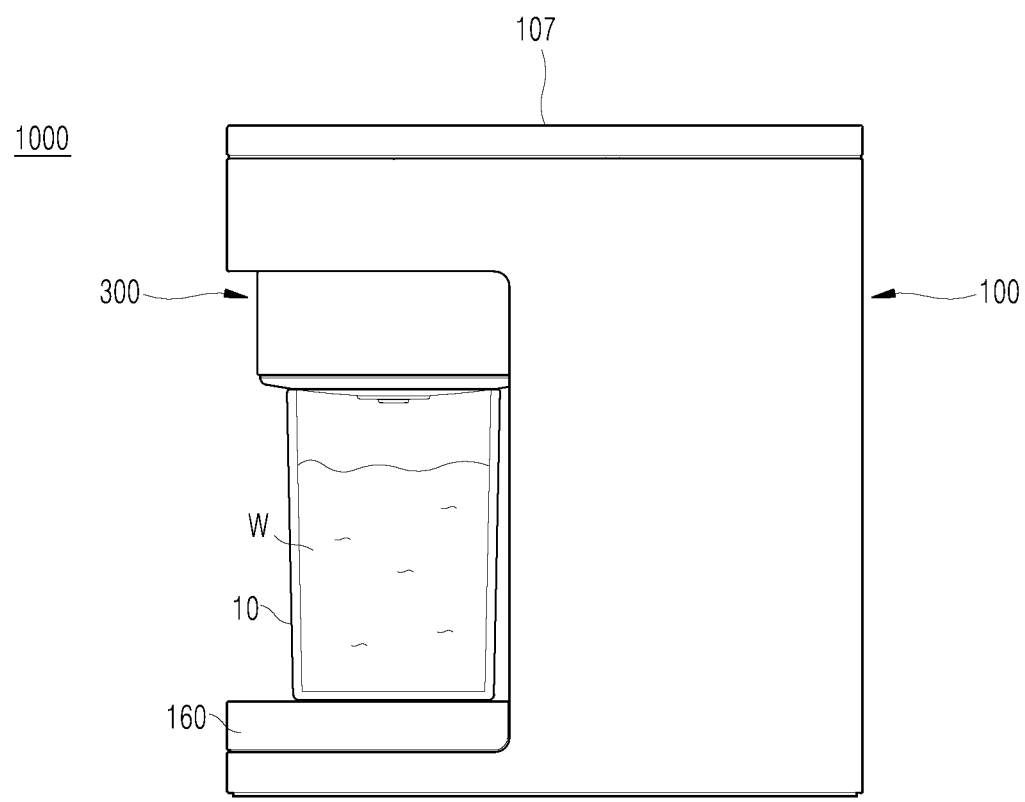
FIG. 5 is a view showing another example of a state using the hydrogen water generator according to the first embodiment of the present invention.

FIG. 5 is a view showing another example of a state using the hydrogen water generator according to the first embodiment of the present invention.

First, a process of manufacturing and storing hydrogen water W in the hydrogen water group 1000 is the same as or similar to an example of a state using the hydrogen water group 1000 described above. Therefore, description of duplicate contents will be omitted.

Referring to FIG. 5, the user may place a water container 10 below the movable water discharger 300 to obtain the generated hydrogen water W. Then, a second signal for discharging the hydrogen water W is inputted. Here, the second signal is a signal that is inputted when the user wants to obtain the hydrogen water W, but does not want to drink it immediately, but may want to drink the hydrogen water at a later time. That is, the second signal causes the controller to move the movable water discharger 300 lower towards the water container 10 until the movable water discharger 300 is in contact with the water container 10.

According to the second signal for discharging the hydrogen water W, the controller prepares the movable water discharger 300 for discharging the hydrogen water W. Then, the movable water discharger 300 descends to a height in contact with the upper surface of the water container 10. In this case, the movable water discharger 300 may press against the upper surface of the water container 10 at a pressure that does not warp or otherwise damage the water container 10 in order to seal the water container 10 from the outside environment. The controller may determine the appropriate pressure through a sensor.

When the movable water discharger 300 is lowered to a height in contact with the upper surface of the water container 10, the movable water discharger 300 discharges the hydrogen water to fill the water container 10. In this case, the amount of hydrogen water W to be filled in the water container 10 through one discharge of water may be set in the hydrogen water generator 1000 by the user. Or, it may be set in advance by the manufacturer of the hydrogen water generator 1000. Alternatively, the hydrogen water W may be discharged while the user presses the operation button 109. The water discharge method of the hydrogen water W may be variously modified as needed.

When the discharge of the hydrogen water W is completed through the above process, the controller may maintain the movable water discharger 300 in a state of contact with the upper surface of the water container 10. The hydrogen water generator 1000 may be placed in the standby mode. When the user wants to obtain the hydrogen water W, a separate signal may be inputted, and the controller may move the movable water discharger 300 back up to its original position in the main body 100. The user may then retrieve the water container 10 and drink the hydrogen water W filled therein.

On the other hand, in the hydrogen water generator 1000 according to an embodiment, under the control of the controller, the movable water discharger 300 may be lowered to the stable discharge height H and may partially discharge the hydrogen water W to partially fill the water container 10. Then the movable water discharger may be further lowered to contact with the upper surface of the water container 10 to discharge the remaining hydrogen water W to fill the water container 10 at the specified level.

Figure 6:
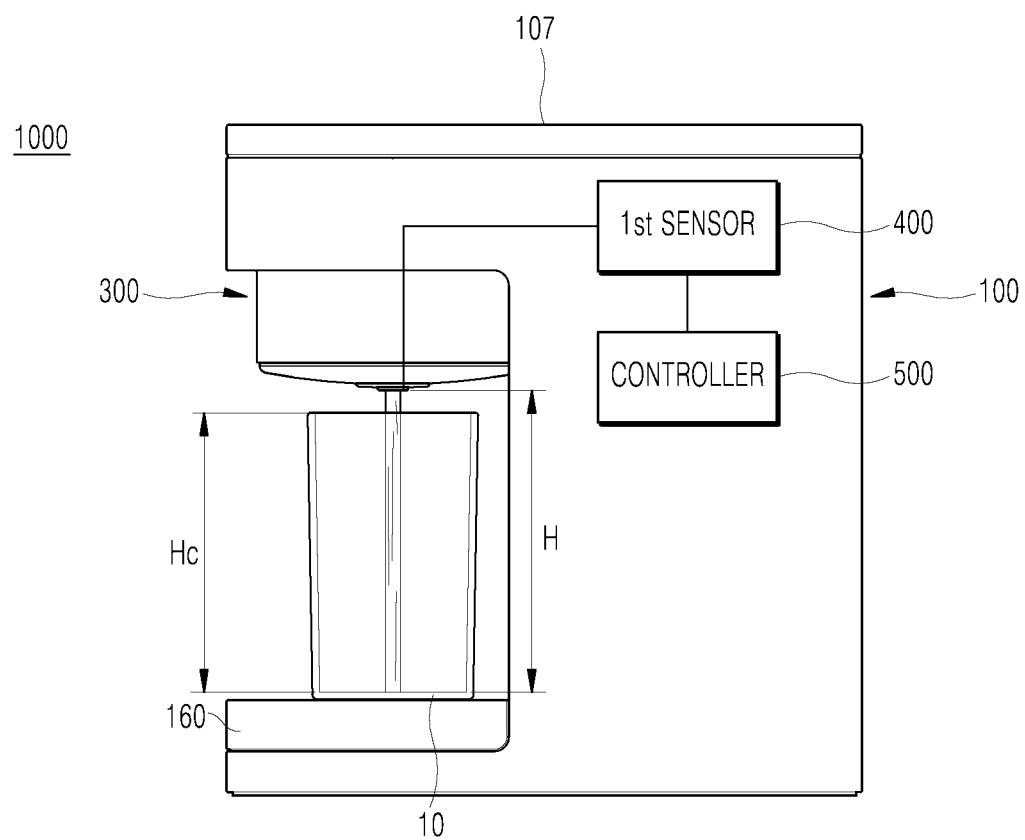
FIGS. 6 to 8 are views showing still another example of a state using the hydrogen water generator according to the first embodiment of the present invention.
Figure 7:
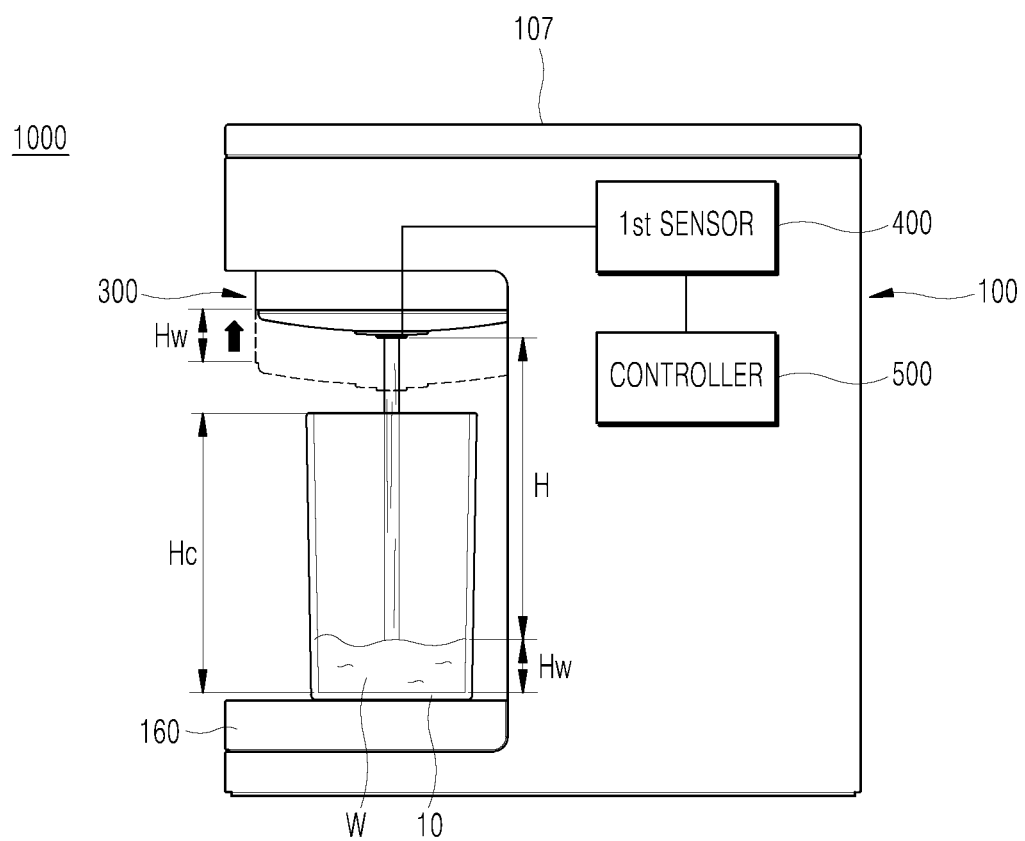
Figure 8:
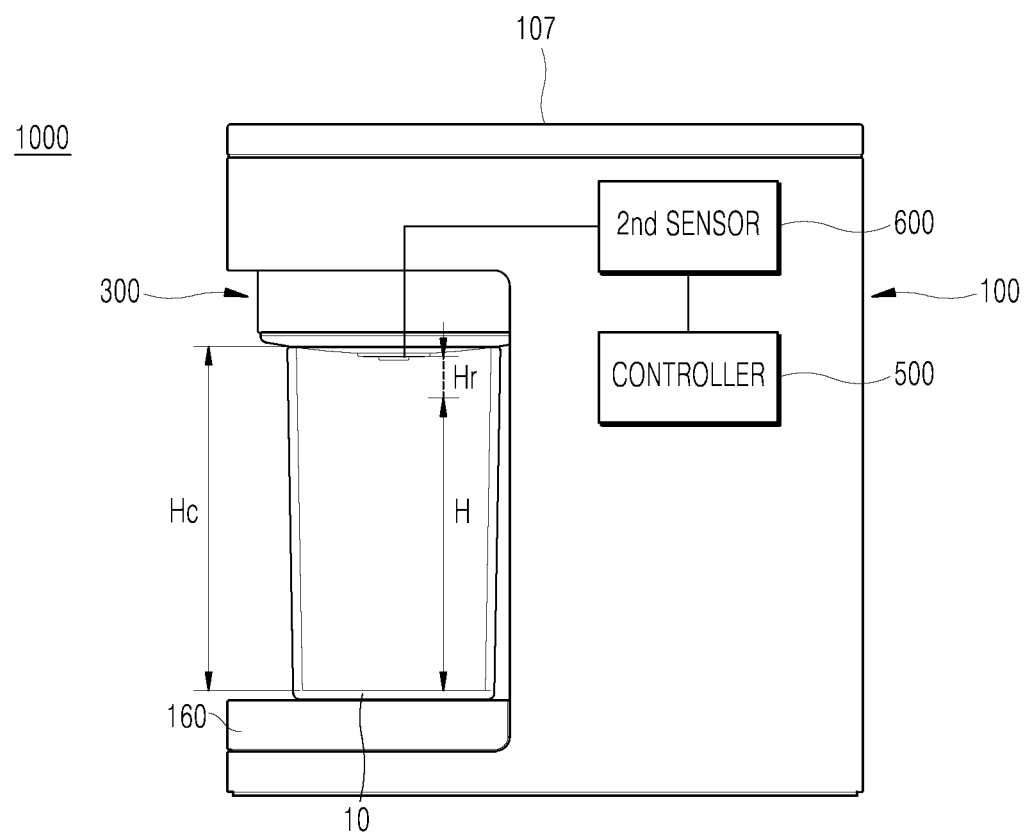

Referring to FIGS. 6 to 8, the hydrogen water generator 1000 according to the first embodiment of the present invention includes the main body 100, the transfer pipe 200, the movable water discharger 300, a first sensor 400, and the controller 500, and may further include a second sensor 600. The controller 500 may be a microprocessor, an integrated circuit, an electrical circuit, a logical electrical circuit, and the like.

The body 100, the transfer pipe 200, and the movable water discharger 300 have been described in detail above, and therefore, detailed description thereof will be omitted.

The first sensor 400 may detect a height level Hw of the hydrogen water W filled in the water container 10 in a state where the water container 10 is disposed below the movable water discharger 300. Therefore, the amount of hydrogen water W discharged through the movable water discharger 300 and filled in the water container 10 may be sensed through the first sensor 400. In this case, the first sensor 400 may include a sensor for measuring a distance between the movable water discharger 300 and the hydrogen water W level surface in the water container 10. For example, the first sensor 400 may include at least one of an ultrasonic sensor, an infrared sensor, or a laser sensor to detect the height level Hw of the hydrogen water W.

The controller 500 may lower the movable water discharger 300 so that the movable water discharger 300 maintains a stable discharge height H from the water level surface of the hydrogen water W detected by the first sensor 400. That is, the distance between the movable water discharger 300 and the hydrogen water W level surface in the water container 10 may be automatically controlled by the controller 500 so as to correspond to the stable discharge height H at all times.

Referring to FIGS. 6 and 7, an example of a state using the hydrogen water generator 1000 will be described in more detail.

First, a process of generating and storing hydrogen water W in the hydrogen water generator 1000 and inputting a signal for hydrogen water discharge is the same as or similar to that described above, and therefore, detailed description thereof will be omitted.

According to the first signal for discharging the hydrogen water W, the controller 500 prepares the movable water discharger 300 for discharging the hydrogen water W, and, as shown in FIG. 6, the movable water discharger 300 is lowered to the stable discharge height H corresponding to the size of the water container 10. When the movable water discharger 300 is lowered to the stable discharge height H, the hydrogen water W is discharged from the movable water discharger 300. Accordingly, as shown in FIG. 7, the hydrogen water W is filled in the water container 10. In this process, if the position of the movable water discharger 300 maintains the state as shown in FIG. 6, the impact applied by the hydrogen water W discharged from the movable water discharger 300 to the hydrogen water W filled in the water container 10 may be gradually reduced. However, since the movable water discharger 300 maintains a state close to the water container 10, it may be difficult for the user to check the height level Hw of the hydrogen water W. In addition, in the process of retrieving the water container 10, such as when the discharge of hydrogen water W is completed, inconvenience may result, such as hitting against the movable water discharger 300.

Therefore, it may be preferable that the movable water discharger 300 is raised corresponding to the height level Hw of the hydrogen water W when the stable discharge height H is maintained. That is, as shown in FIG. 7, the movable water discharger 300 may be raised as the height level Hw of the hydrogen water W rises. Accordingly, the hydrogen water generator 1000 according to the present embodiment maintains a state capable of automatically minimizing hydrogen release during discharge of hydrogen water W. That is, the height level Hw of the hydrogen water W filled in the water container 10 is detected by the sensor 400, and the controller 500 raises the height of the movable water discharger 300 while maintaining the stable discharge height H. When the hydrogen water W generated in the hydrogen water generator 1000 is discharged to the water container 10 through the movable water discharger 300, the hydrogen water is discharged while automatically maintaining the stable discharge height H. Accordingly, high concentration of hydrogen in the hydrogen water W may be discharged stably and the water container 10 may be retrieved more conveniently.

Here, the first sensor 400 may additionally detect a height Hc of the water container 10 in a state in which the water container 10 is disposed below the movable water discharger 300. To this end, the first sensor 400 may measure the distance from the upper surface of the water container 10 to the bottom of the water container 10. The controller 500 may limit the discharge of the hydrogen water W when the height level Hw of the hydrogen water W with respect to the container height Hc of the water container 10 is greater than or equal to a set threshold ratio (or level). In detail, when the user uses various water containers 10, the capacity of the hydrogen water W that may be accommodated in each water container 10 may be different. In this case, a problem may occur in the water container 10 being used if the automatic system described above is used.

For example, when the hydrogen water W is discharged, the user may need to confirm as to what height the hydrogen water W needs to be discharged. If the water container 10 has a relatively small capacity and there is no separate confirmation by the user, the hydrogen water W may overflow from the water container 10. However, such a user confirmation process may be very cumbersome for the user. Such a confirmation process may also mean that the water discharge function is not automatic. Therefore, it may be necessary to make the hydrogen water discharge of appropriate volume be made irrespective of the size of the water container 10 being used. To this end, the hydrogen water generator 1000 according to the present embodiment may sense the container height Hc of the water container 10 and the height level Hw of the hydrogen water W together in order to discharge hydrogen water W of appropriate volume. Accordingly, a proper amount of hydrogen water W discharge to the water container 10 may be made.

The second sensor 600 may sense a pressure applied to a contact surface of the movable water discharger 300 in a state in which the water container 10 and the movable water discharger 300 are in close contact with each other. Accordingly, an adhesion between the movable water discharger 300 and the water container 10 may be detected through the second sensor 600. In this case, the second sensor 600 may measure the pressure applied to a lower surface of the movable water discharger 300. For example, the second sensor 600 may include a strain gauge to measure the pressure applied to the lower surface of the movable water discharger 300. The controller 500 may limit the lowering of the movable water discharger 300 when the pressure detected by the second sensor 600 is greater than or equal to a set threshold pressure.

Referring now FIG. 8, if the container height Hc of the water container 10 is higher than the stable discharge height H, the stable discharge height H may not be attained. In this case, in order to maintain the stable discharge height H, the movable water discharger 300 should be further lowered by a limit height Hr. However, since the movable water discharger 300 is in close contact with the upper surface of the water container 10, hydrogen escaping from the hydrogen water W may be prevented even if the stable discharge height H is not maintained. Rather, even in such a case where the movable water discharger 300 is to be further lowered by the limit height Hr, it may result in the movable water discharger 300 unnecessarily pressing hard against the water container 10. Therefore, if the movable water discharger 300 is in a state of being in close contact with the upper surface of the water container 10, the controller 500 may stop lowering the movable water discharger 300. To this end, the hydrogen water generator 1000 according to the present embodiment senses the pressure in which the water container 10 and the movable water discharger 300 are in close contact with each other, and thereby further lowering of the movable water discharger 300 may be restricted. Accordingly, an optimum discharge height corresponding to the container height Hc of the water container 10 may be realized.

Figure 9:
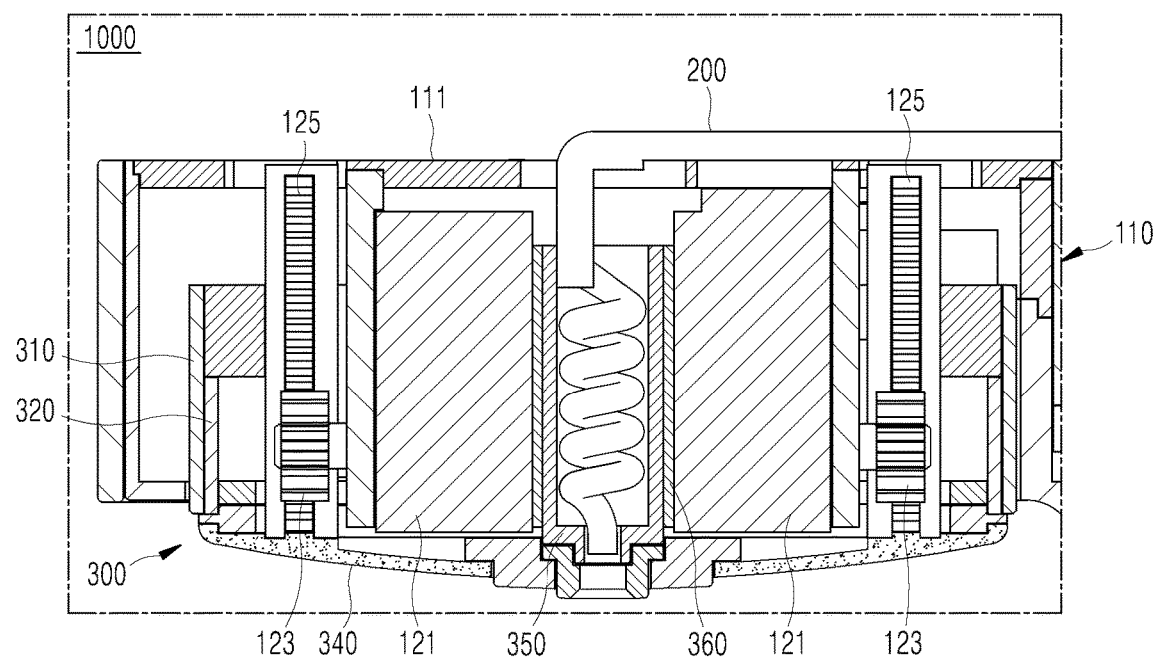
FIGS. 9 and 10 are cross-sectional views showing in more detail with respect to a moving of a movable water discharger in the hydrogen water generator according to the first embodiment of the present invention.
Figure 10:
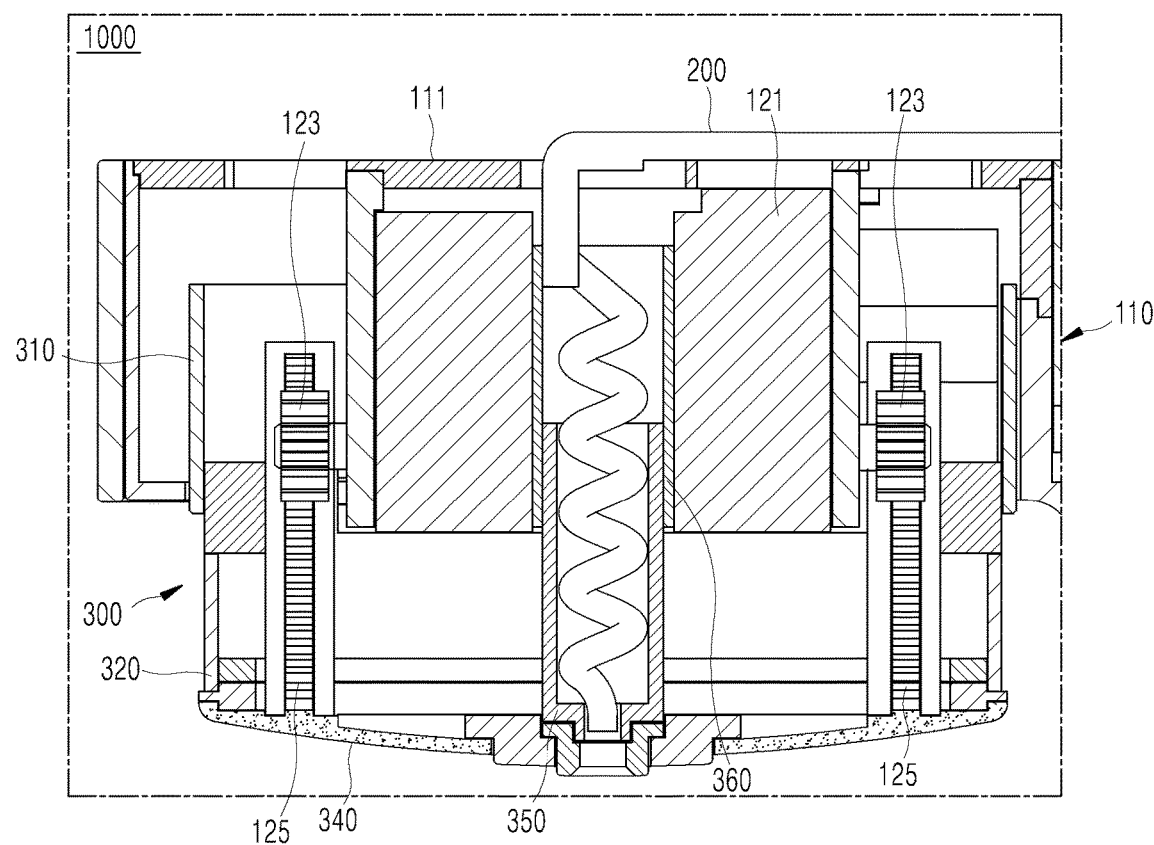

FIGS. 9 and 10 are cross-sectional views showing in more detail with respect to the moving of the movable water discharger in the hydrogen water generator according to the first embodiment of the present invention.

Referring to FIGS. 9 and 10, in the hydrogen water generator 1000 according to the first embodiment of the present invention, the main body 100 includes an upper cradle 110, and the movable water discharger 300 disposed therein. The movable water discharger 300 may include a first casing 310, a second casing 320, and a shielding plate 340, and may include a discharge pipe 350. The upper cradle 110 may be formed with a first protrusion 111 protruding in the first transverse direction with respect to an upper surface of the main body 100. In this case, based on the drawing shown in FIG. 3, the first transverse direction refers to the left direction. The first protrusion 111 refers to a portion protruding in the left direction of the upper end of the main body 100.

The upper cradle 110 may be a portion disposed at the upper end of the main body 100. The upper cradle 110 may support the movable water discharger 300 with respect to the main body 100. That is, the movable water discharger 300 may move up and down from a lower portion of the first protrusion 111 in a state installed at the first protrusion 111 of the upper cradle 110. The first casing 310 may be a portion which is disposed along the longitudinal direction with respect to an upper surface of the main body 100 and may be supported by the first protrusion 111. The first casing 310 may be a tubular member that serves as a guide for the movable second casing 320. The second casing 320 may be a portion which is also disposed along the longitudinal direction and having an outer diameter thereof that fits into an inner diameter of the first casing 310 such that the outer circumferential surface of the second casing 320 is circumscribed to the inner circumferential surface of the first casing 310. The second casing 320 may also be a tubular member that moves along the longitudinal direction in a state where the vertical displacement thereof is limited by the first casing 310.

Specifically, as shown in FIG. 9, in the state where the movable water discharger 300 is retracted into the upper cradle 110, the second casing 320 is inserted into the first casing 310 to maintain an overlapping state. And as shown in FIG. 10, in the state where the movable water discharger 300 is lowered, the second casing 320 slides downward from the first casing 310. However, a portion of an upper end of the second casing 320 remains inserted in the first casing 310 to be overlapped with each other.

The shielding plate 340 may cover a lower through surface of the second casing 320 and may be coupled to the second casing 320. The shield plate 340 may allow the lower through surface of the second casing 320 to be shielded from the outside environment except for the discharge pipe 350. The shielding plate 340 may be a part forming the appearance of the lower surface of the movable water discharger 300. The shielding plate 340 may block the internals of the movable water discharger 300 from the outside air and seal the internals therein other than the discharge pipe 350. In the present embodiment, the shielding plate 340 may be made of an elastic material such as rubber, plastic, and the like which may seal the upper surface of the water container 10 when contact is made.

The discharge pipe 350 may be disposed along the longitudinal direction at the movable water discharger 300 having an upper end thereof coupled to the transfer pipe 200, and the lower end thereof passing through the shielding plate 340 to be exposed to the outside environment. The discharge pipe 350 may be a tubular member positioned at the end portion of the hydrogen water transfer path through which the hydrogen water is discharged. That is, the hydrogen water stored at the hydrogen water generator 1000 may be discharged to the outside of the hydrogen water generator 1000 through the discharge pipe 350.

In the hydrogen water generator 1000 according to the present embodiment, the outer circumferential surface of the second casing 320 is circumscribed to the inner circumferential surface of the first casing 310, and the second casing 320 may move up and down which may be limited by the first casing 310 to adjust the height h (see FIG. 4) in which the hydrogen water is discharged.

In the hydrogen water generator 1000 according to the present embodiment, the main body 100 may further include a first motor 121, a first pinion 123, and a first rack 125. The first motor 121 may be installed on the first protrusion 111 to generate a rotational force around its shaft when power is supplied. Under the control of the controller 500, the first motor 121 may provide a driving force for moving the movable water discharger 300 up and down. That is, the first motor 121 may convert the electrical energy of the supplied power to the kinetic energy of the rotational force that is used to move the movable water discharger 300 up and down.

In the present embodiment, the first pinion 123 may be coupled to the shaft of the first motor 121 and may rotate about the central axis when the first motor 121 is rotated. The first pinion 123 may have a sawtooth structure formed on the outer peripheral surface of the first pinion 123. The teeth may engage with the first rack 125 to transmit the rotational force provided by the first motor 121 to the first rack 125. The first rack 125 may be disposed to extend in the longitudinal direction at the movable water discharger 300 so that one surface of the rack 125 is installed to engage the outer circumferential surface of the first pinion 123 and the other surface is coupled to the second casing 320. The first rack 125 has a sawtooth structure formed on one surface to engage with the teeth of the first pinion 123, and the rotational force of the first pinion 123 is converted into a linear motion by the first rack 125. As a result, when the first pinion 123 rotates, the first rack 125 may move up and down in the longitudinal direction and the second casing 320, which is coupled to the first rack 125, may also move up and down in the longitudinal direction.

Specifically, as shown in FIG. 9, in a state where the movable water discharger 300 has retracted into the upper cradle 110, the lower surface of the first rack 125 is engaged with the first pinion 123. And, as shown in FIG. 10, when the first motor 121 has rotated the first pinion 123 in the state where the movable water discharger 300 is lowered, the upper surface of the first rack 125 is engaged with the first pinion 123. As described above, in the hydrogen water generator 1000 according to the present embodiment, the movable water discharger 300 is lifted by a lifter, which in this case may be the first motor 121, the first pinion 123, and the first rack 125, and the height h of the water discharge may be adjusted more precisely and stably. The lifter may have a different configuration other than the one described above. Further, the arrangement position and the number of motors, pinions, and racks shown in the drawings are exemplary, and the present invention is not limited thereto. In the present embodiment, a plurality of first racks 125 are disposed so that each of the first racks 125 is symmetrically disposed on the plane of the shield plate 340, and a plurality of first motors 121 and first pinions 123 are disposed so that each of the first motor 121 and the first pinion 123 engage with the corresponding first rack 125. That is, each first rack 125 may be arranged to divide the second casing 320 evenly. In addition, the first motor 121 and the first pinion 123 may be disposed to correspond with each of the first racks 125 arranged as described above.

In the hydrogen water generator 1000 according to the present embodiment, the movable water discharger 300 includes a plurality of first motors 121, first pinions 123, and first racks 125 symmetrically arranged to administer equal driving force. Accordingly, it may be possible to prevent the movable water discharger 300 from wobbling when moving up and down.

In the hydrogen water generator 1000 according to the present embodiment, a portion of the transfer pipe 200 may be formed of a flexible material such that the portion thereof may be stretched or bent. The reason is that when the movable water discharger 300 moves up and down with respect to the main body 100, the transfer pipe 200 connected to the main body 100 should not hinder with the movement of the movable water discharger 300. For example, when the movable water discharger 300 is lowered, the transfer pipe 200 requires an extra length corresponding to the lowered length. If the transfer pipe 200 does not secure such extra length, it may not be possible for the movable water discharger 300 to lower itself as the length of the transfer pipe 200 may prevent the movable water discharger 300 from being lowered. In order to prevent this, at least a part of the transfer pipe 200 providing the transfer path of hydrogen water may be formed to elastically stretch and retract. The transfer pipe 200 may need to deform so as not to hinder the movable water discharger 300 when the movable water discharger 300 moves up and down.

For example, as shown in FIGS. 9 and 10, a portion of the transfer pipe 200 coupled to the movable water discharger 300 may be formed in a spiral spring shape. The spiral spring shape may vary and deform along the longitudinal direction when the movable water discharger 300 moves up and down. As such, in the hydrogen water generator 1000 according to the present embodiment, the flexible material portion of the transfer pipe 200 deforms when the movable water discharger 300 moves up and down so that the hydrogen water transfer path is not disturbed. Accordingly, even if the hydrogen water discharge position is changed as the movable water discharger 300 moves, the discharge of the hydrogen water may be smooth and uniform.

In the hydrogen water generator 1000 according to the present embodiment, the main body 100 may include the upper cradle 110, and the movable water discharger 300 may include the first casing 310, the second casing 320, and the shielding plate 340, and may further include a connector 360, and an outlet pipe 350. The upper cradle 110, the first casing 310, the second casing 320, and the shielding plate 340 have been described in detail above, and therefore, detailed description thereof will be omitted.

The connection pipe 360 may be disposed in the longitudinal direction at the movable water discharger 300, and an upper end thereof may be coupled to the transfer pipe 200 and may be coupled and supported by the upper cradle 110. The connection pipe 360 may be a tubular member that may serve as a guide during lifting of the outlet pipe 350. According to the structure of the connection pipe 360, the outlet pipe 350 is disposed along the longitudinal direction and has an outer diameter that corresponds to an inner diameter of the connection pipe 360 such that the outer peripheral surface of the outlet pipe 350 may overlap with the inner peripheral surface of the connection pipe 360. In addition, a lower end of the outlet pipe 350 may pass through the shielding plate 340 to be exposed at the lower portion of the shielding plate 340 and may be coupled to the shielding plate 340.

Specifically, as shown in FIG. 9, in the state where the movable water discharger 300 is retracted into the upper cradle 110, the outlet pipe 350 inserts into the connection pipe 360 to maintain an overlapping state. And, as shown in FIG. 10, in the state where the movable water discharger 300 is lowered, the outlet pipe 350 slides down from the connecting pipe 360. An upper end of the outlet pipe 350 may remain inserted in the connection pipe 360 to overlap with each other. The movable water discharger 300 moves up and down in a state in which the outer circumferential surface of the outlet pipe 350 is circumscribed to the inner circumferential surface of the connecting pipe 360. In addition, the outlet pipe 350 may also be lifted so that the hydrogen water transfer path is not hindered when the movable water discharger 300 is lifted.

In the hydrogen water generator 1000 according to the present embodiment, when the movable water discharger 300 is lifted, the outlet pipe 350 coupled to the inner circumferential surface of the connecting pipe 360 is lifted together so that the hydrogen water transfer path is not hindered. Accordingly, even if the hydrogen water discharge position is changed, the discharge of the hydrogen water may be smooth and uniform.

In the hydrogen water generator 1000 according to the present embodiment, the main body 100 may include the upper cradle 110 and a seating part 160. The upper cradle 110 includes a first protrusion 111 protruding towards the first transverse direction and may be disposed at the upper end of the main body 100 and the movable water discharger 300 may be movably disposed at a lower portion of the first protrusion 111. Accordingly, the movable water discharger 300 may be lowered from the lower portion of the first protrusion 111 in a state of being retracted in the first protrusion 111 of the upper cradle 110. The seating part 160 may be provided with a second protrusion 161 protruding toward the first transverse direction and may be disposed at the lower end of the main body 100. Accordingly, the user may place the water container 10 on the seating part 160 to fill the water container 10 with hydrogen water. That is, the seating part 160 may be installed with the second protrusion 161 protruding in parallel with the first protrusion 111 in which the movable water discharger 300 is installed. Accordingly, the user may control the hydrogen water generator 1000 to discharge the hydrogen water after placing the water container 10 on the second protrusion 161. Therefore, the hydrogen water generator 1000 according to the present embodiment may include a main body 100 having an upper cradle 110 and a seating part 160, and when the movable water discharger 300 is lowered, the seating part 160 may support the water container 10 with respect to the main body 100 by supporting the water container 10 thereon.

The hydrogen water generator 1000 according to the present embodiment may be used in a state where the water container 10 is placed on the seating part 160. Accordingly, the seating part 160 may stably support the water container 10 at the time of the hydrogen water discharge and after the discharge of the hydrogen water until the user drinks the hydrogen water.

Figure 11:
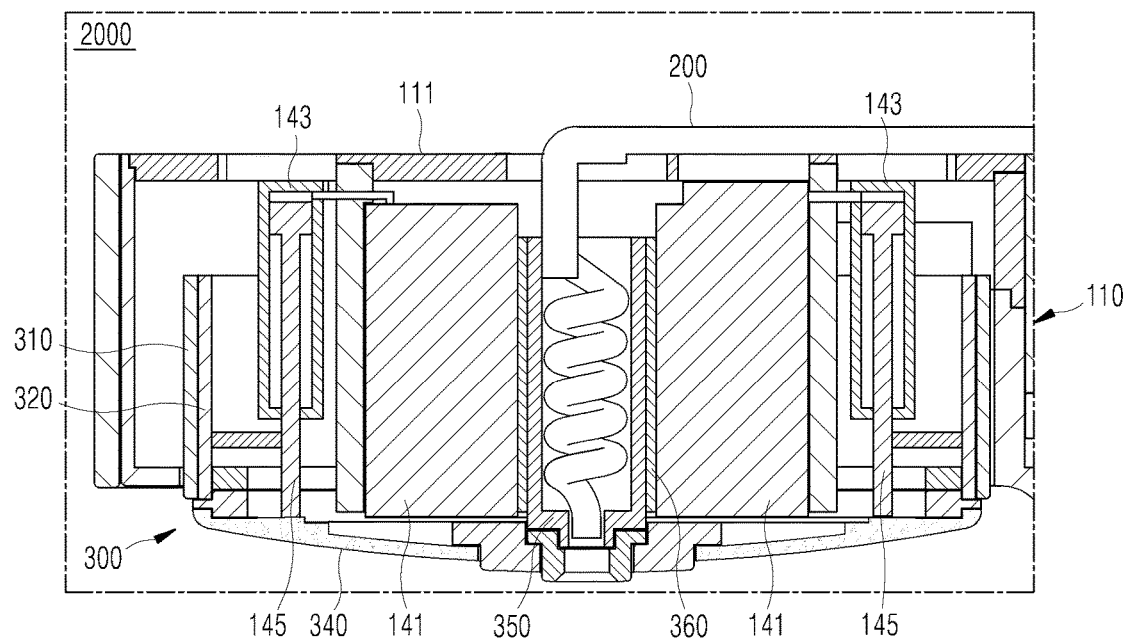
FIGS. 11 and 12 are cross-sectional views showing in more detail with respect to a moving of an movable water discharger in a hydrogen water generator according to a second embodiment of the present invention.
Figure 12:
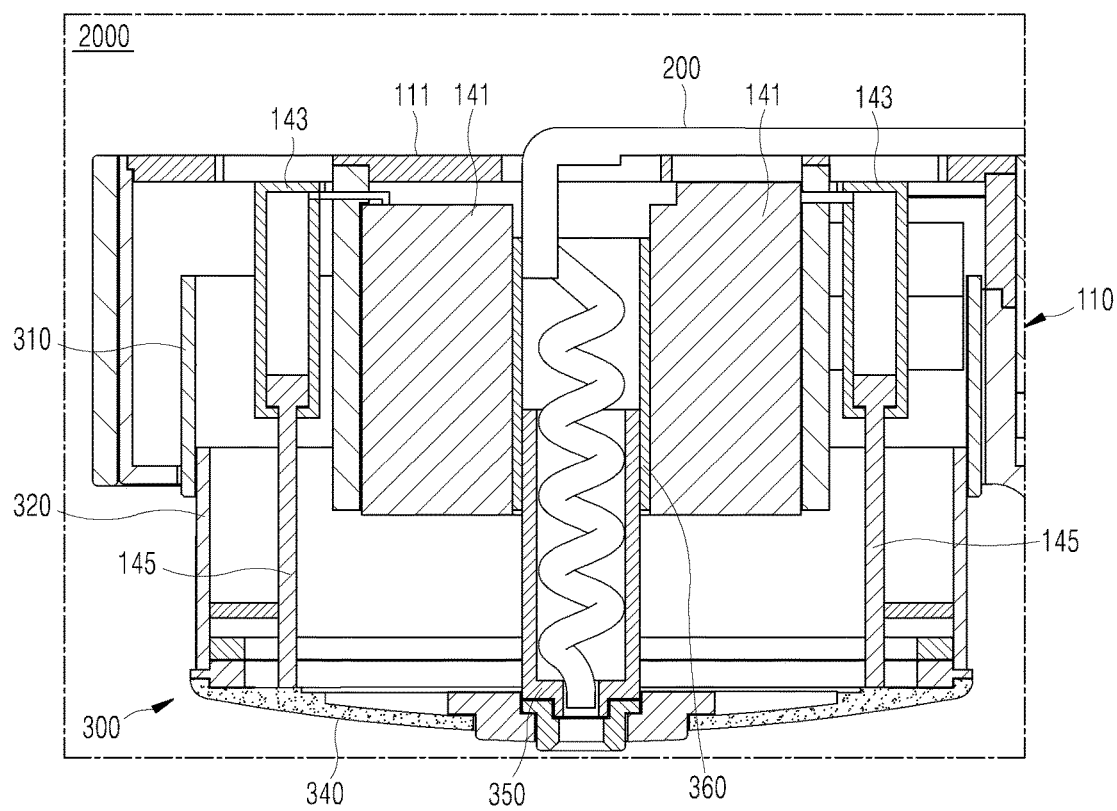

FIGS. 11 and 12 are cross-sectional views showing in more detail with respect to the lifting of the movable water discharger in the hydrogen water generator according to a second embodiment of the present invention.

Referring to FIGS. 11 and 12, in the hydrogen water generator 2000 according to the second embodiment of the present invention, the main body 100 includes a first pump 141, a first cylinder 143, and a first piston 145. Under the control of the controller 500, the first pump 141 may be installed in the upper cradle 110 to generate a fluid pressure by discharging or sucking fluid when the power is supplied. The first pump 141 may provide a driving force for moving the moving water generator 300 up and down. That is, the first pump 141 may convert the electrical energy of the supplied power into the kinetic energy of the fluid to move the movable water discharger 300 up and down. In this case, the first pump 141 may be coupled to a separate pipe or the like to provide a fluid pressure to the first cylinder 143 without restriction according to the installation position thereof. Therefore, the first pump 141 does not necessarily need to be installed at the upper cradle 110. The first pump 141 may be installed anywhere at the hydrogen water generator 2000 or outside of the hydrogen water generator 2000. However, in order to simplify the structure and to increase the energy transfer efficiency, it may be desirable to install the first pump 141 at the first protrusion 111 of the upper cradle 110.

The first cylinder 143 may be disposed in the longitudinal direction at the movable water discharger 300 and may be coupled to the first pump 141 to receive the fluid pressure generated by the first pump 141, and may be supported by the protrusion 111. The first cylinder 143 may serve as a guide for the first piston 145. The first cylinder 143 may receive the fluid pressure provided from the first pump 141 which may move the first piston 145 up and down. The first piston 145 may have an upper end portion which is inserted into the first cylinder 143 and the lower end which is coupled to the second casing 320 so as to move the second casing 320 in the longitudinal direction according to the fluid pressure inside the first cylinder 143. The first piston 145 may convert the kinetic energy of the fluid in the first cylinder 143 into a linear motion in the longitudinal direction. As a result, the first piston 145 may move up and down in the longitudinal direction according to the magnitude of the fluid pressure in the first cylinder 143. The second casing 320 coupled to the first piston 145 may also move up and down along the longitudinal direction.

Specifically, as shown in FIG. 11, in the state where the movable water discharger 300 is retracted into the upper cradle 110, the first piston 145 is disposed as far as possible into the first cylinder 143. As shown in FIG. 12, in the state where the movable water discharger 300 is lowered, the first pump 141 may discharge the fluid to increase the pressure in the first cylinder 143. Accordingly, the first piston 145 having the upper end portion inserted into the first cylinder 143 may be push towards the lower end of the first cylinder 143. As such, in the hydrogen water generator 2000 according to the present embodiment, the movable water discharger 300 may move up and down through the transmission of the driving force through the first pump 141, the first cylinder 143, and the first piston 145. Accordingly, the height h of the water discharge may be adjusted more precisely and stably.

In the hydrogen water generator 2000 according to the present embodiment, the movable water discharger 300 is lifted by a lifter, which in this case may be the first pump 141, the first cylinder 143, and the first piston 145. The lifter may have a different configuration other than the one described above. The arrangement position and the numbers of the pumps, the cylinders, and the pistons illustrated in the drawings are exemplary for convenience of description and the present invention is not necessarily limited thereto. In the present embodiment, a plurality of first pistons 145 are disposed so that each of the first pistons 145 is symmetrically disposed on the plane of the shield plate 340, and a plurality of first pumps 141 and first cylinders 143 are disposed so that each of the first pump 141 and the first cylinder 143 engage with the corresponding first piston 145. That is, each first piston 145 may be arranged to divide the second casing 320 evenly. In addition, a first cylinder 143 may be disposed for each of the first pistons 145 disposed as described above. In another embodiment, one first pump 141 may be used to supply fluid pressure to the plurality of first cylinders 143.

In the hydrogen water generator 2000 according to the present embodiment, the movable water discharger 300 receives an equal driving force from the plurality of first cylinders 143 and the first pistons 145 disposed symmetrically with each other. Accordingly, it is possible to prevent the movable water discharger 300 from wobbling when moving up and down. Except for the above-described configuration, the hydrogen water generator 2000 according to the second embodiment of the present invention has the same or similar structure as the hydrogen water generator 1000 according to the first embodiment of the present invention. Therefore, other detailed descriptions will be omitted.

Figure 13:
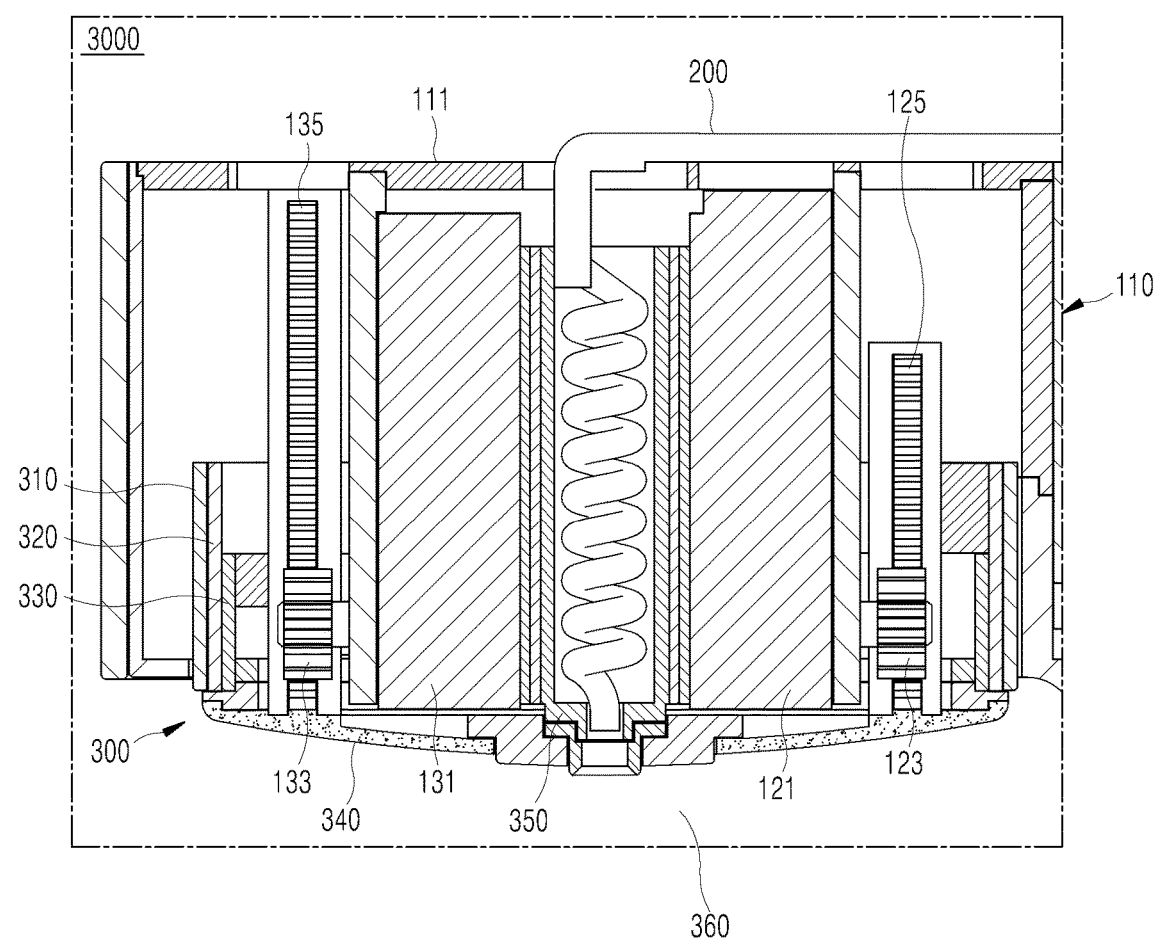
FIGS. 13 to 15 are cross-sectional views showing in more detail with respect to a moving of an movable water discharger in a hydrogen water generator according to a third embodiment of the present invention.
Figure 14:
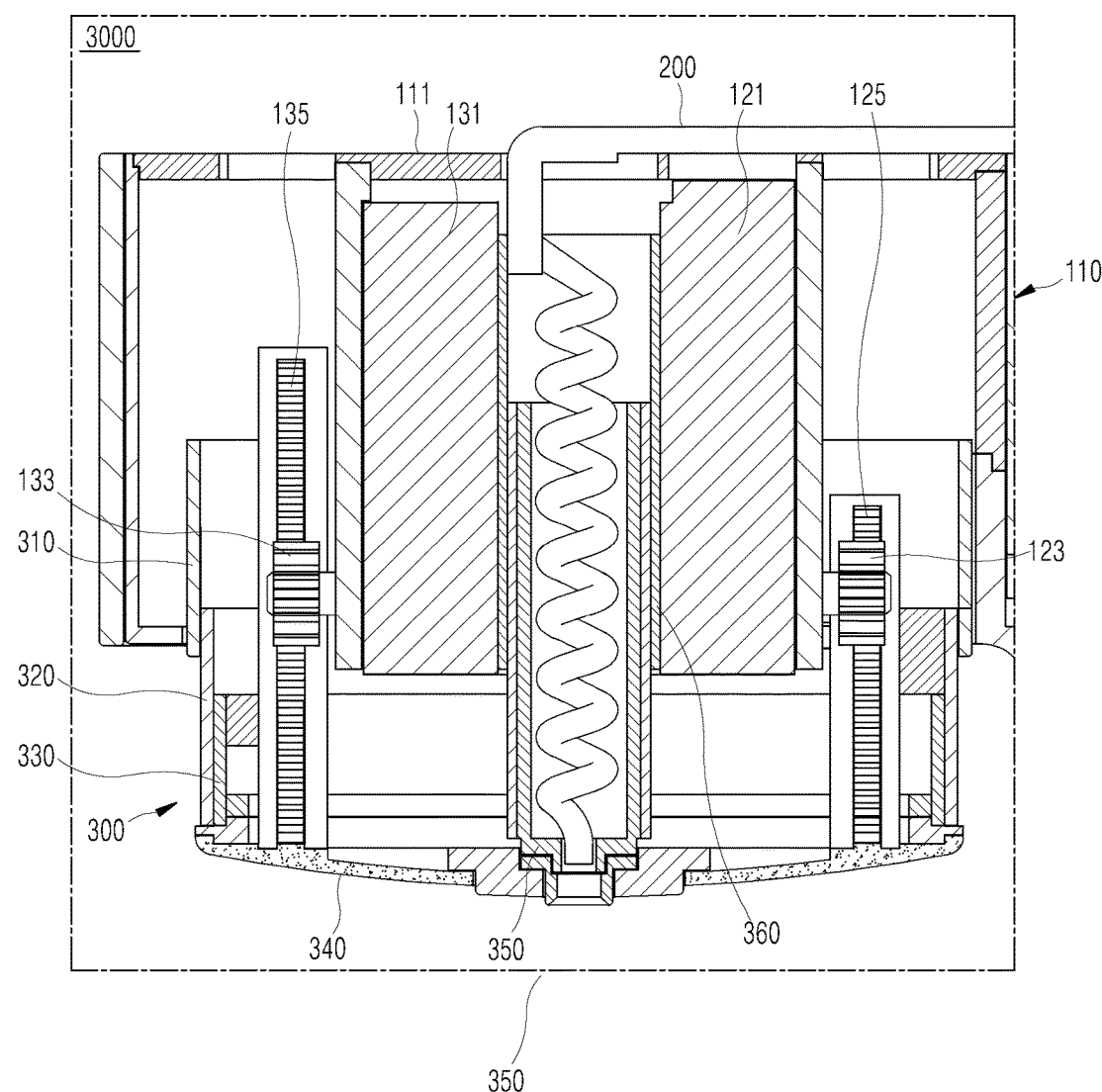
Figure 15:
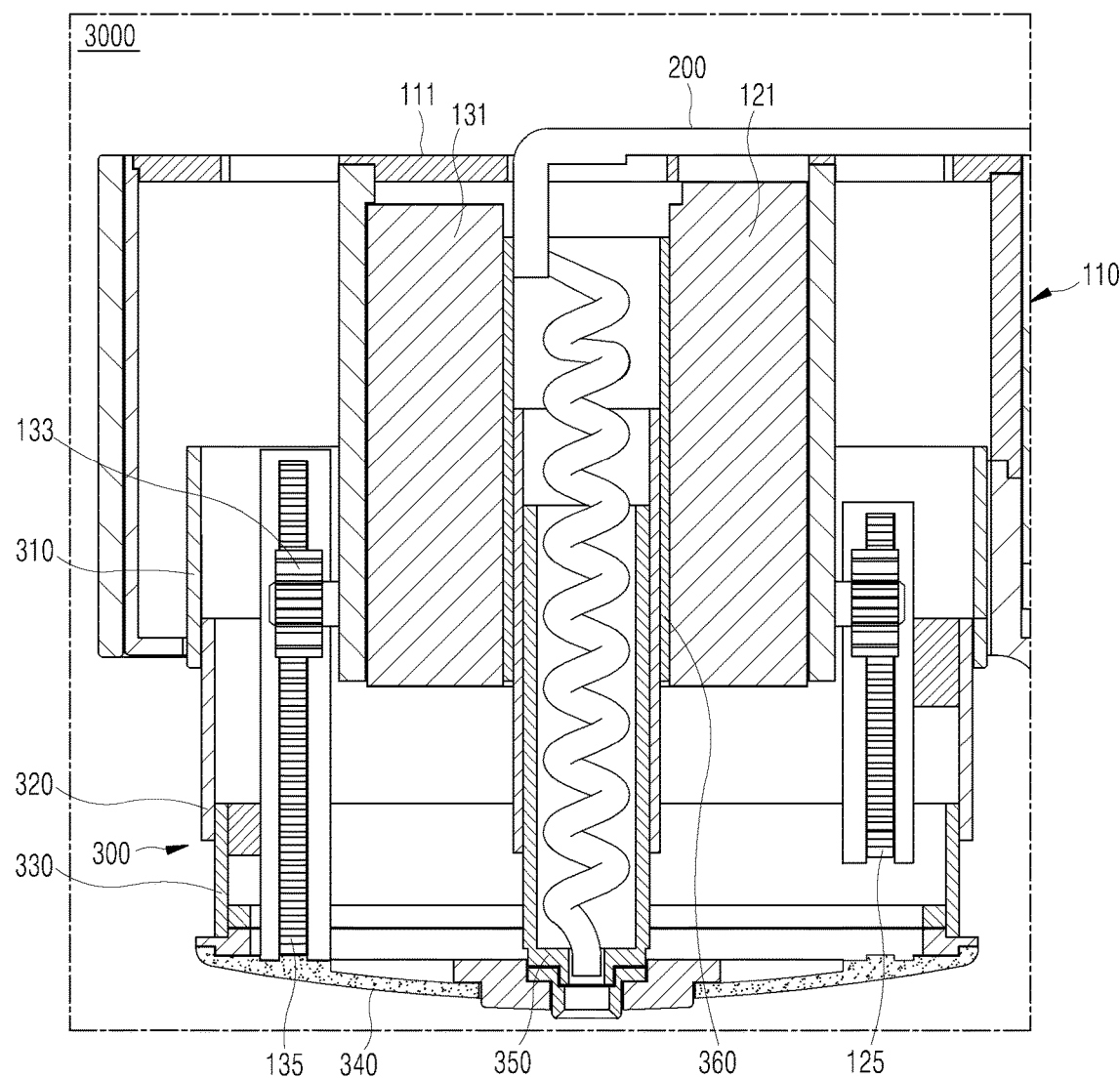

FIGS. 13 to 15 are cross-sectional views showing in more detail with respect to a lifting of a movable water discharger in a hydrogen water generator according to a third embodiment of the present invention.

As shown in FIGS. 13 to 15, in the hydrogen water generator 3000 according to the third embodiment of the present invention, the main body 100 includes the upper cradle 110, and the movable water discharger 300 includes the first casing 310, the second casing 320, the shielding plate 340, and the discharge pipe 350. The movable water discharger 300 may further include a third casing 330.

The upper cradle 110, the first casing 310, the second casing 320, and the outlet pipe 350 have been described in detail above, and therefore, detailed description thereof will be omitted.

The third casing 330 is disposed along the longitudinal direction at the movable water discharger 300 so that the outer diameter thereof corresponds to the inner diameter of the second casing 320 so that the outer circumferential surface of the third casing 330 is circumscribed to the inner circumferential surface of the second casing 320. The third casing 330 may be a tubular member that moves along the longitudinal direction in a state where the vertical displacement thereof is limited by the second casing 320.

According to the structure of the third casing 330, the shielding plate 340 may cover a lower through surface of the third casing 330 and may be coupled to the third casing 330. The shield plate 340 may allow the lower through surface of the third casing 330 to be shielded from the outside environment except for the water discharge pipe 350.

The lifting of the movable water discharger 300 of the hydrogen water generator 3000 according to this embodiment is as follows.

First, as shown in FIG. 13, in a state where the movable water discharger 300 is retracted into the upper cradle 110, the second casing 320 is inserted into the first casing 310. In addition, the third casing 330 is inserted into the second casing 320 to maintain an overlapped state. As shown in FIG. 14, in the state where the movable water discharger 300 is partially lowered to a first end, only the second casing 320 slides downward from the first casing 310 while the third casing 330 remains inserted in the second casing 320. Accordingly, only a part of the upper end of the second casing 320 remains inserted into the first casing 310 to overlap with each other. The third casing 330 may still be inserted in the second casing 320 to maintain an overlapped state. Although not shown, when the second casing 320 slides downward from the first casing 310, the third casing 330 may also be configured to slide downward from the second casing 320. As shown in FIG. 15, in the state where all of the casings of the movable water discharger 300 descends to a second end, the third casing 330 slides downward from the second casing 320. Accordingly, only a portion of the upper end of the third casing 330 remains inserted in the second casing 320 to overlap with each other.

The hydrogen water generator 3000 according to the present embodiment has multiple stages of the height h of the hydrogen water discharge through the adjustment of the first casing 310, the second casing 320, and the third casing 330. Accordingly, the lifting range of the movable water discharger 300 may be made larger. In the hydrogen water generator 3000 according to the present embodiment, the main body 100 includes the first motor 121, the first pinion 123, and the first rack 125, and may further include a second motor 131, and a second pinion 133, and a second rack 135. The first motor 121, the first pinion 123, and the first rack 125 have been described in detail above, and therefore, detailed description thereof will be omitted.

The second motor 131 may be installed at the upper cradle 110 and may generate a rotational force around its shaft when the power is supplied. Under the control of the controller 500, the second motor 131 may provide a driving force for moving the movable water discharger 300 together with the first motor 121. The second pinion 133 may be coupled to the shaft of the second motor 131 and may rotate about the central axis when the second motor 131 is rotated. The second pinion 133 may have a sawtooth structure formed on the outer peripheral surface of the second pinion and the teeth may engage with the second rack 135. Through this, the rotational force provided by the second motor 131 may be transmitted to the second rack 135. The second rack 135 may be disposed to extend in the longitudinal direction at the movable water discharger 300 so that one surface of the second rack 135 may engage with the outer circumferential surface of the second pinion 133 and the other surface may be coupled to the third casing 330. A sawtooth structure may be formed on one surface and the teeth meshes with the second pinion 133. Through this, the rotational force transmitted from the second pinion 133 is converted into a linear motion by the second rack 135. In this case, the second rack 135 may be formed longer relative to the first rack 125. Accordingly, when the second pinion 133 rotates, the second rack 135 may move up and down in the longitudinal direction and the third casing 330 coupled to the second rack 135 may also move up and down in the longitudinal direction.

Specifically, as shown in FIG. 13, in a state where the movable water discharger 300 has retracted into the upper cradle 110, the lower surface of the first rack 125 is engaged with the first pinion 123. In addition, the lower surface of the second rack 135 is engaged with the second pinion 133. As shown in FIG. 14, in the state where the movable water discharger 300 is lowered to a first end, the first motor 121 rotates the first pinion 123 and the interlocked first rack 125 is lowered. As a result, the upper surface of the first rack 125 is engaged with the first pinion 123. At the same time, the second motor 131 rotates the second pinion 133 and the second rack 135 engaged with the second pinion 133 is lowered. As a result, the surface of the central portion of the second rack 135 is engaged with the second pinion 133. At this time, the third casing 330 may still be inserted in the second casing 320 to maintain a state of being overlapped with each other. As shown in FIG. 15, in the state where the movable water discharger 300 descends to the second end, the second motor 131 rotates the second pinion 133 and the second rack 135 engaged with the second pinion 133 is further lowered. As a result, the upper surface of the second rack 135 is engaged with the second pinion 133.

The hydrogen water generator 3000 according to the present embodiment includes the first motor 121, the first pinion 123, the first rack 125, the second motor 131, the second pinion 133, and the second rack 135. The movable water discharger 300 may be elevated in multiple stages through the transmission of the driving force through the two racks 125 and 135. Accordingly, it may be possible to adjust the height h of the hydrogen water discharge precisely and stably while increasing the lifting range.

In the hydrogen water generator 3000 according to the present embodiment, the rising and lowering of the second casing 320 with respect to the first casing 310 and the rising and lowering of the third casing 330 with respect to the second casing 320 may be performed step by step. That is, when viewing the hydrogen water generator 3000 from the outside, the first step of the second casing 320 descending with respect to the first casing 310 may be performed. Thereafter, the second step of the third casing 330 descending with respect to the second casing 320 may be performed. In addition, the first step of the third casing 330 ascending with respect to the second casing 320 may be performed. Thereafter, the second step of the second casing 320 ascending with respect to the first casing 310 may be performed. Of course, the lowering and rising orders described above may be configured to be reversed.

As described above, the hydrogen water generator 3000 according to the present embodiment may have a multi-step lifting operation of the movable water discharger 300. Accordingly, the user may select to lift only a specific step according to the water container 10. Except for the above-described configuration, the hydrogen water generator 3000 according to the third embodiment of the present invention has the same or similar structure of the hydrogen water generator 1000 and 2000 according to the first or second embodiment of the present invention. Therefore, other detailed descriptions will be omitted.

Figure 16:
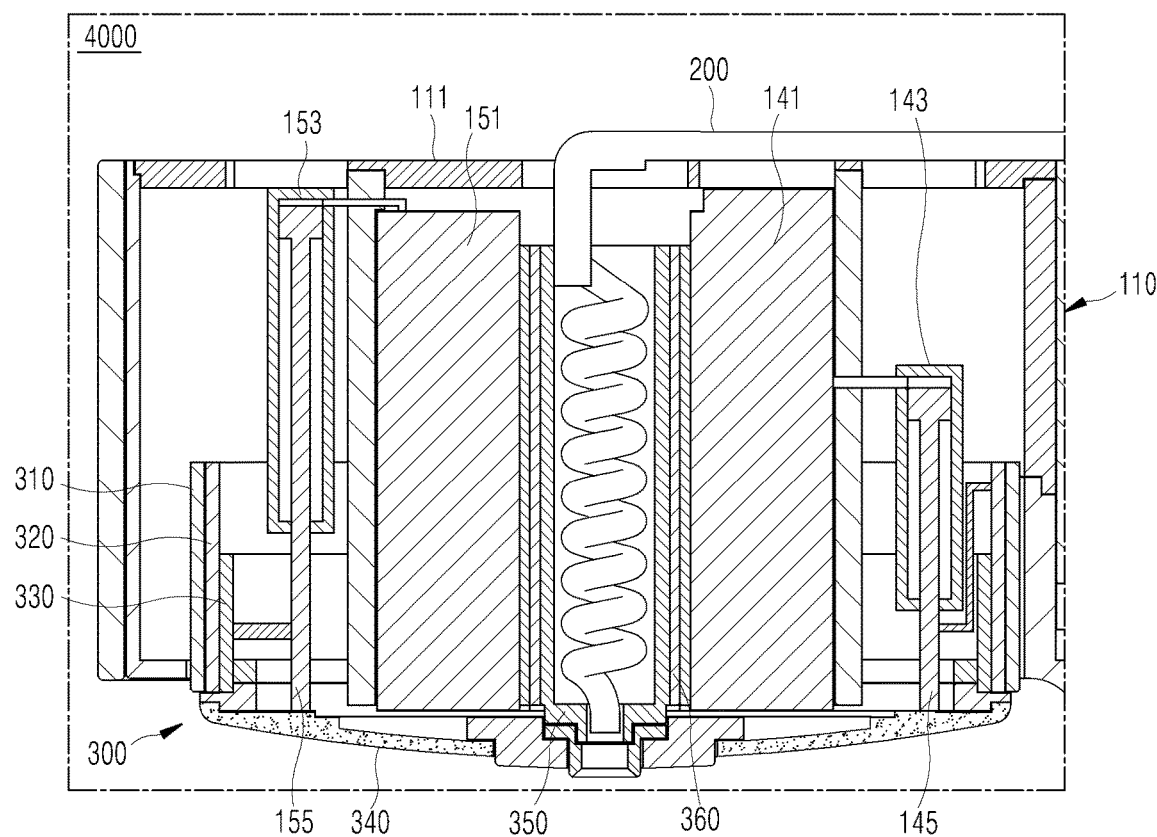
FIGS. 16 to 18 are cross-sectional views showing in more detail with respect to a moving of an movable water discharger in a hydrogen water generator according to a fourth embodiment of the present invention.
Figure 17:
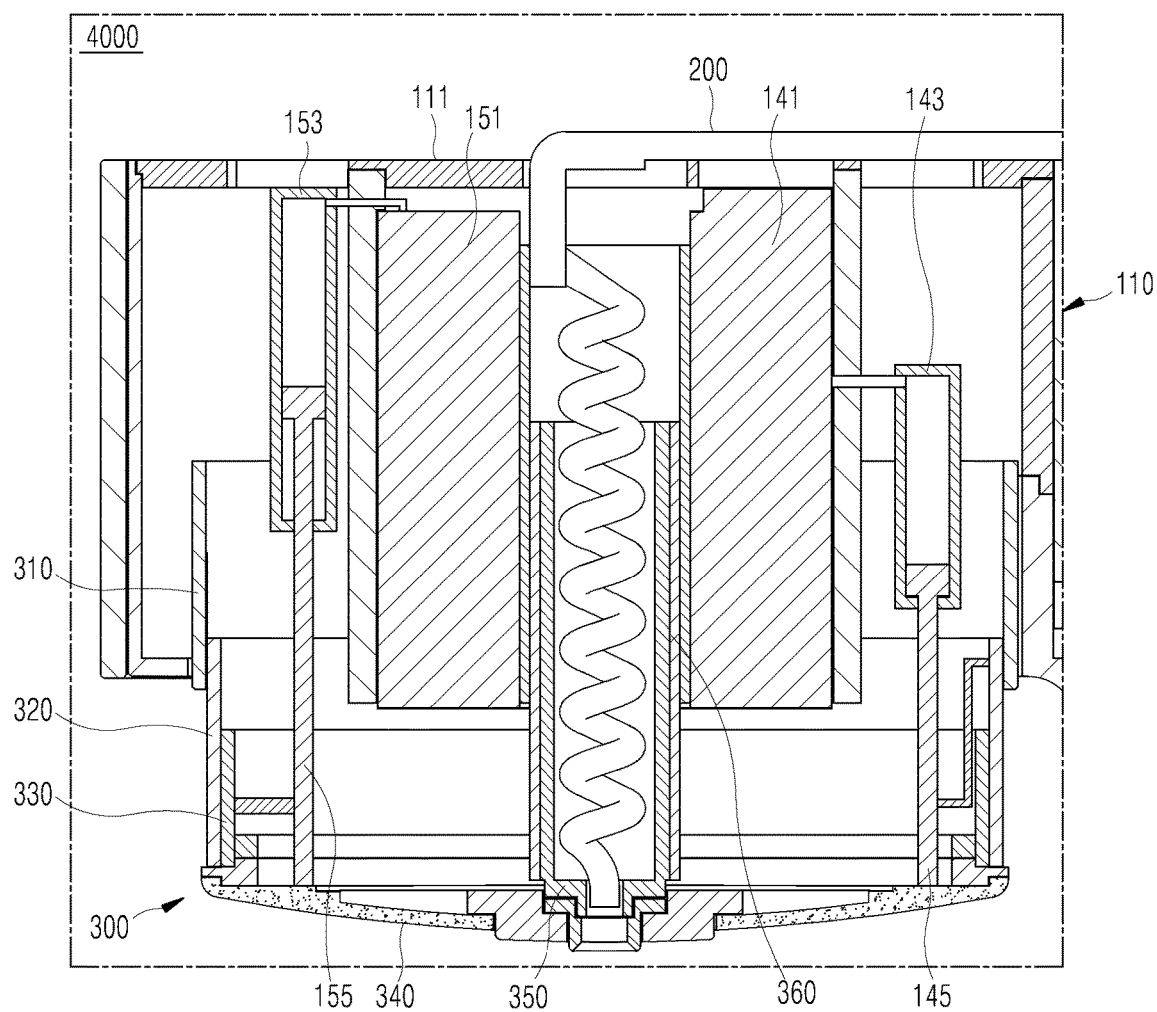
Figure 18:
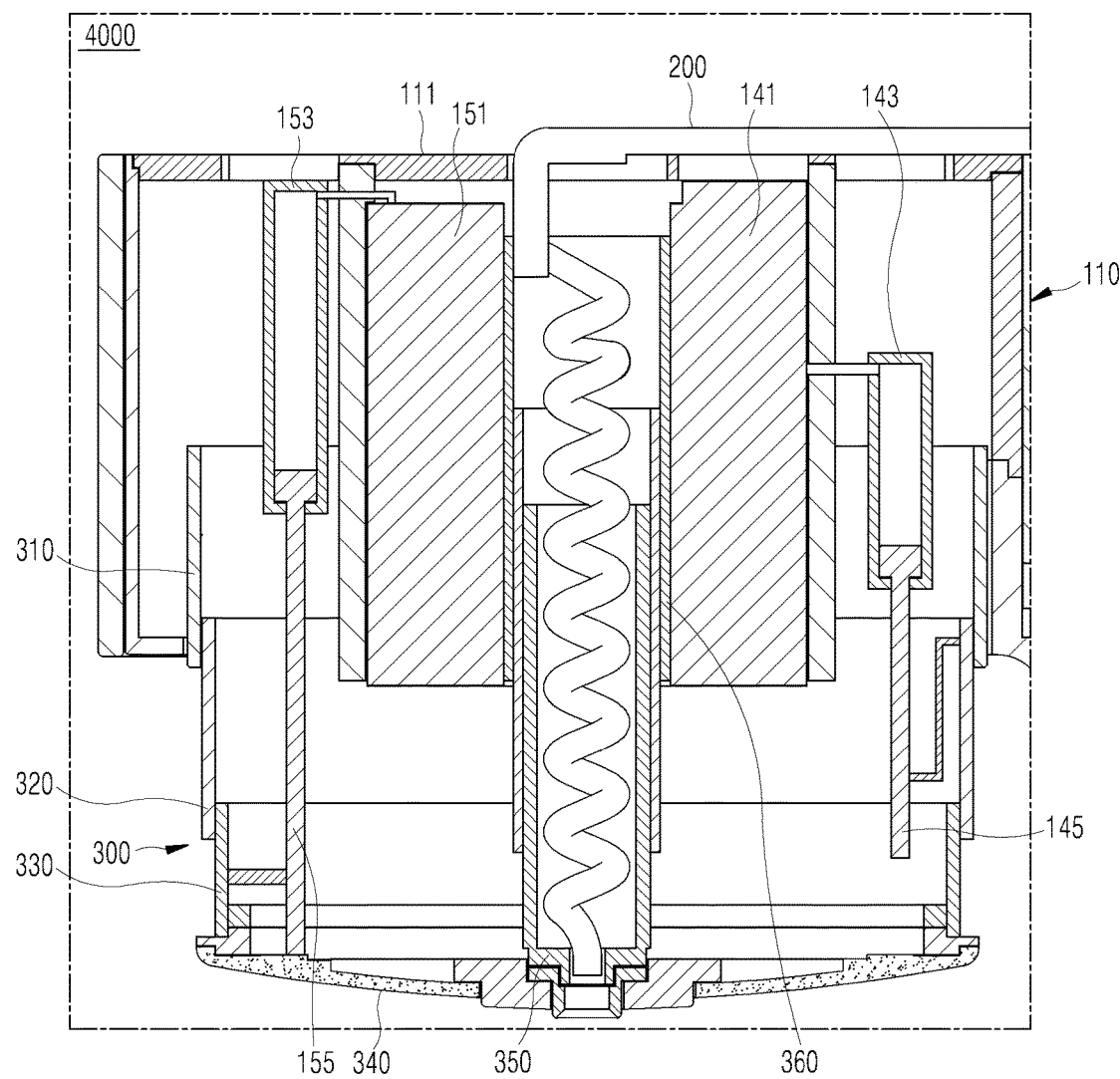

FIGS. 16 to 18 are cross-sectional views showing in more detail with respect to a lifting of an movable water discharger in a hydrogen water generator according to a fourth embodiment of the present invention.

Referring to FIGS. 16 to 18, in the hydrogen water generator 4000 according to the fourth embodiment of the present invention, the main body 100 includes the first pump 141, the first cylinder 143, and the first piston 145, and may further include a second pump 151, a second cylinder 153, and a second piston 155. The first pump 141, the first cylinder 143, and the first piston 145 have been described in detail above, and therefore, detailed description thereof will be omitted.

The second pump 151 may be installed at the upper cradle 110 to generate the fluid pressure by discharging or sucking fluid when the power is supplied. Under the control of the controller, the second pump 151 may provide a driving force for moving the movable water discharger 300 together with the first pump 141. In this case, the second pump 151 also does not necessarily need to be installed at the upper cradle in that it may provide the fluid pressure to the second cylinder 153 without restriction according to the installation position. However, in order to simplify the structure and increase the energy transfer efficiency, it may be desirable to install the second pump 151 at the upper cradle 110.

The second cylinder 153 may be disposed in the longitudinal direction at the movable water discharger 300 and may be coupled to the second pump 151 to receive the fluid pressure generated by the second pump 151, and may be supported by the upper cradle 110. The second cylinder 153 may serve as a guide for raising and lowering the second piston 155. The second cylinder 153 may receive the fluid pressure provided from the second pump 151 which move the second piston 155 up and down. The second piston 155 may have an upper end portion which is inserted into the second cylinder 153 and a lower end portion which is coupled to the third casing 330 so as to move the third casing 330 in the longitudinal direction according to the fluid pressure inside the second cylinder 153. The second piston 155 may convert the kinetic energy of the fluid in the second cylinder 153 into a linear motion in the longitudinal direction. The second cylinder 153 and the second piston 155 may be relatively longer than the first cylinder 143 and the first piston 145, respectively. The second piston 155 may move up and down in the longitudinal direction according to the magnitude of the fluid pressure in the second cylinder 153 and the third casing 330 coupled to the second piston 155 may also move up and down along the longitudinal direction.

Specifically, as shown in FIG. 16, in the state where the movable water discharger 300 has retracted into the upper cradle 110, the first piston 145 is inserted into the first cylinder 143 as far as possible. In addition, the second piston 155 is inserted into the second cylinder 153 as far as possible. As shown in FIG. 17, in the state where the movable water discharger 300 is lowered to a first end, the first pump 141 discharges the fluid to increase the pressure in the first cylinder 143. As a result, the first piston 145 having the upper end portion inserted into the first cylinder 143 is pushed to the lower end portion of the first cylinder 143. At the same time, the second pump 151 discharges the fluid to increase the pressure in the second cylinder 153, the second piston 155 having the upper end portion inserted into the second cylinder 153 is pushed to the center of the second cylinder 153. At this time, the third casing 330 may still be inserted in the second casing 320 to maintain a state of being overlapping with each other. As shown in FIG. 18, in the state where the movable water discharger 300 descends to the second end, the second pump 151 discharges the fluid to further increase the pressure in the second cylinder 153. Through this, the second piston 155 inserted in the second cylinder 153 is further lowered, and the upper end of the second piston 155 is pushed to the lower end portion of the second cylinder 153.

As described above, the hydrogen water generator 4000 according to the present embodiment includes the first pump 141, the first cylinder 143, the first piston 145, the second pump 151, the second cylinder 153, and the second piston 155. The movable water discharger 300 may be lifted in multiple stages through the transmission of the driving force through the two pistons 155. Accordingly, it may be possible to adjust the height h of the hydrogen water discharge precisely and stably while increasing the lifting range. Except for the above-described configuration, the hydrogen water generator 4000 according to the fourth embodiment of the present invention has the same or similar structure of the hydrogen water generator 1000 or 2000 or 3000 according to any one of the first to third embodiments of the present invention. Therefore, other detailed descriptions will be omitted.

Figure 19:
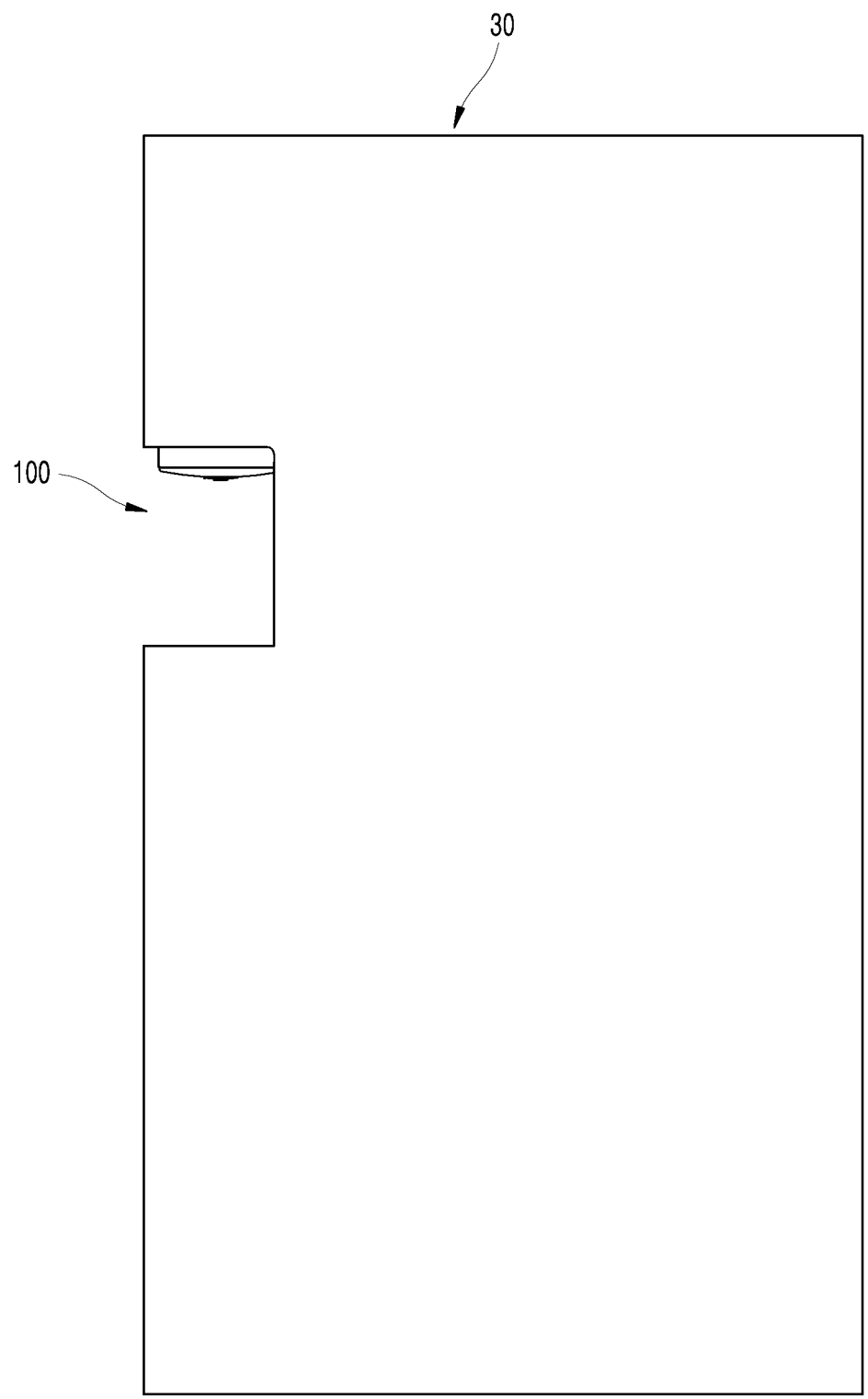
FIG. 19 is a view showing a hydrogen water generator according to an embodiment of the present invention integrated with an appliance.

According to various embodiments of the present invention, the hydrogen water generator of the present invention may be coupled with another appliance such as a water dispenser, a water purifier or a refrigerator and the like to form part of that appliance. That is, the main body 100 of the hydrogen water generator may be integrally formed with the appliance 30 as shown in FIG. 19. The appliance 30 may also function, for example, as a water dispenser, a water purifier, or a refrigerator and the like.

While embodiments of the present disclosure have been described above with reference to the drawings, the present invention is not limited to the above-described embodiments, and it will be apparent to those skilled in the art that the embodiments may be modified without departing from the spirit and scope of the present invention. It will be understood that modifications and variations are possible. Therefore, the scope of the present invention should not be defined by the described embodiments, but should be determined by the technical spirit described in the claims.

What is claimed is:

1. A hydrogen water generator comprising:
    a water tank for receiving and storing water;
    an electrode module coupled to the water tank for generating hydrogen water;
    a movable water discharger;
    a transfer tube for transferring the hydrogen water from the water tank to the movable water discharger;
    a sensor; and
    a controller,
    wherein the controller is configured to move the movable water discharger from an original position to a height with respect to a water container based on a sensing by the sensor,
    wherein the sensor is configured to sense a level of the hydrogen water filled in the water container as the water container is filled with the hydrogen water discharged by the movable water discharger; and
    the controller is configured to move the movable water discharger such that a distance between the movable water discharger and the level of the hydrogen water remains constant and is limited by a predetermined range or value that prevents hydrogen from escaping the hydrogen water.

2. The hydrogen water generator of claim 1, wherein the controller is configured to move the movable water discharger to the height with respect to the water container based on at least one of a height and a size of the water container sensed by the sensor.

3. The hydrogen water generator of claim 2, wherein the controller is configured to limit the discharge of the hydrogen water from the movable water discharger when the height of the water container and a level of the filled hydrogen water in the water container is greater than or equal to a set threshold ratio.

4. The hydrogen water generator of claim 2, wherein the controller is configured to move the movable water discharger to the original position when the discharge of the hydrogen water is complete.

5. The hydrogen water generator of claim 2, wherein the controller is configured to cause the movable water discharger to partially fill the water container with hydrogen water, move the movable water discharger to make contact with an upper surface of the water container, and then completely fill the water container with hydrogen water.

6. The hydrogen water generator of claim 2, wherein the controller is configured to move the movable water discharger to make contact with an upper surface of the water container when the discharge of the hydrogen water is complete.

7. The hydrogen water generator of claim 1, further comprising another sensor, wherein the controller is configured to restrict an amount of pressure applied to an upper surface of the water container based on a pressure sensed by the another sensor during a contact between the movable water discharger and the upper surface of the water container.

8. The hydrogen water generator of claim 1, wherein the controller is configured to move the movable water discharger to make contact with an upper surface of the water container.

9. The hydrogen water generator of claim 1, wherein the movable water discharger comprises:
a first casing;
a second casing retractably inserted at the first casing; and
a lifter,
wherein the controller is configured to control the lifter to protrude the second casing from the first casing when the controller is adjusting the height between the movable water discharger and the water container.

10. The hydrogen water generator of claim 9, wherein the lifter comprises a motor, a pinion, and a rack.

11. The hydrogen water generator of claim 9, wherein the lifter comprises a pump, a cylinder, and a piston.

12. The hydrogen water generator of claim 9, wherein a portion of the transfer tube at the movable water discharger is elastic such that the transfer tube stretches when the second casing protrudes from the first casing.

13. The hydrogen water generator of claim 9, wherein the movable water generator further comprises a third casing retractably inserted in the second casing and another lifter,
wherein the controller is configured to control the lifter and the another lifter so that the second casing protrudes from the first casing, and then the third casing protrudes from the second casing, and
the controller is configured to control the lifter and the another lifter so that the third casing retracts to the second casing, and then the second casing retracts to the first casing.

14. An appliance comprising a body including the hydrogen water generator of claim 1.

15. A hydrogen water generator comprising:
a body including
a first protrusion at an upper portion of the body, the first protrusion including a movable water discharger, and
a second protrusion at a lower portion of the body facing the first protrusion, the second protrusion including a seating part in which a water container is seated;
a water tank for receiving and storing water;
an electrode module coupled to the water tank for generating hydrogen water;
a transfer tube for transferring the hydrogen water from the water tank to the movable water discharger;
a sensor; and
a controller,
wherein the controller is configured to move the movable water discharger from an original position to a height with respect to the water container based on a sensing by the sensor,
wherein the sensor is configured to sense a level of the hydrogen water filled in the water container as the water container is filled with the hydrogen water discharged by the movable water discharger; and
the controller is configured to move the movable water discharger such that a distance between the movable water discharger and the level of the hydrogen water remains constant and is limited by a predetermined range or value that prevents hydrogen from escaping the hydrogen water.

16. The hydrogen water generator of claim 15, wherein the controller is configured to move the movable water discharger to the height with respect to the water container based on at least one of a height and a size of the water container sensed by the sensor.

17. The hydrogen water generator of claim 16, further comprising another sensor, wherein the controller is configured to restrict an amount of pressure applied to an upper surface of the water container based on a pressure sensed by the another sensor during contact between the movable water discharger and an upper surface of the water container.

18. The hydrogen water generator of claim 17, wherein the movable water discharger comprises:
a first casing;
a second casing retractably inserted at the first casing; and
a lifter,
wherein the controller is configured to control the lifter to protrude the second casing from the first casing when the controller is adjusting the height between the movable water discharger and the water container.

19. A hydrogen water generator comprising:
a water tank for receiving and storing water;
an electrode module coupled to the water tank for generating hydrogen water;
a movable water discharger;
a transfer tube for transferring the hydrogen water from the water tank to the movable water discharger;
a sensor; and
a controller,
wherein the controller is configured to move the movable water discharger from an original position to a height with respect to a water container based on a sensing by the sensor,
wherein when the sensor senses the height of the water container as being higher than the height the controller is configured to move the movable water discharger with respect to the water container, the controller is configured to move the movable water discharger such that a lower surface of the movable water discharger makes contact with an upper surface of the water container such that the water container is hermetically sealed from the outside air by the lower surface of movable water discharger.

* * * * *